(12) United States Patent
Nagasawa

(10) Patent No.: US 9,120,448 B2
(45) Date of Patent: Sep. 1, 2015

(54) FOUR-POINT SEAT BELT DEVICE

(71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/202,989

(22) Filed: Mar. 10, 2014

(65) Prior Publication Data
US 2014/0303851 A1    Oct. 9, 2014

(30) Foreign Application Priority Data
Mar. 15, 2013    (JP) .................... 2013-054127

(51) Int. Cl.
*B60R 22/00*  (2006.01)
*B60R 21/015*  (2006.01)
*B60R 22/02*  (2006.01)
*B60R 22/20*  (2006.01)

(52) U.S. Cl.
CPC ........... *B60R 21/01544* (2014.01); *B60R 22/02* (2013.01); *B60R 22/201* (2013.01); *B60R 2022/026* (2013.01); *B60R 2022/027* (2013.01)

(58) Field of Classification Search
USPC .......... 701/36, 45, 49; 280/801.1, 801.2, 802, 280/807, 808; 297/468, 469, 470, 474, 475, 297/476, 477, 479, 484; 180/268, 271
See application file for complete search history.

(56) References Cited

U.S. PATENT DOCUMENTS 4,175,787 A * 11/1979 Muskat .................. 297/484
6,076,894 A    6/2000 Busch
6,139,111 A   10/2000 Pywell et al.
6,293,588 B1   9/2001 Clune
6,305,713 B1  10/2001 Pywell et al.
6,309,024 B1  10/2001 Busch
6,375,270 B1   4/2002 Sullivan et al.
6,769,716 B2   8/2004 Rouhana et al.
6,773,075 B2   8/2004 Rouhana et al.
6,817,629 B2  11/2004 Herberg et al.
7,201,399 B2   4/2007 Frank et al.
7,513,558 B2 *  4/2009 Hansen ................. 296/68.1
7,625,048 B2  12/2009 Rouhana et al.
8,066,303 B2  11/2011 Nezaki
2004/0251675 A1  12/2004 Herberg et al.
2009/0322067 A1 * 12/2009 Nezaki .................. 280/807

FOREIGN PATENT DOCUMENTS

JP    2004-330975 A    11/2004
JP    2010-58679 A      3/2010

* cited by examiner

*Primary Examiner* — Thomas Tarcza
*Assistant Examiner* — Edward Pipala
(74) *Attorney, Agent, or Firm* — Smith, Gambrell & Russell, LLP

(57) ABSTRACT

A four-point seat belt device includes: a right hip belt and left hip belt to press against the hip bone of a passenger: a right shoulder belt and a left shoulder belt to press against both shoulders: a drive unit to retract the right and left hip belts, and the right and left shoulder belts: an engagement detection unit to detect that the right and left hip belts and the right and left shoulder belts are engaged via a buckle: and a detection unit to detect that the right hip belt and the left hip belt are not making contact with the passenger. The drive unit retracts the right and left hip belts after the engagement detection unit detects an engagement and the detection unit detects that the right hip belt and left hip belt are not making contact with the passenger.

14 Claims, 18 Drawing Sheets

FOUR-POINT SEAT BELT DEVICE

CROSS REFERENCES TO RELATED APPLICATIONS

The present application claims priority from Japanese Patent Application No. 2013-054127 filed on Mar. 15, 2013, the entire contents of which are hereby incorporated by reference.

BACKGROUND

1. Technical Field

The present technology relates to a four-point seat belt device installed in vehicles such as automobiles.

2. Related Art

Seat belts for ensuring the safety of passengers are installed in vehicles such as automobiles. There are several types of seat belts including three-point seat belts, and also four-point seat belts which include shoulder belts to restrain both the right and left shoulders of the passenger.

Japanese Unexamined Patent Application Publication (JP-A) No. 2004-330975 discloses a technology which, in order to improve the restraint performance of four-point seat belts, sets the retraction force of the lap belts to be larger than the retraction force of the shoulder belts when retracting the lap belts that restrain the hips and the shoulder belts that restrain the shoulders.

JP-A No. 2010-58679 discloses a technology which, in order to correct the buckle position of the shoulder belts and the buckle position of the lap belts, detects the extended length of the lap belts and the extended length of the shoulder belts and then performs an adjustment control to reduce any differences in the extended lengths of the left and right lap belts and differences in the extended lengths of the left and right shoulder belts, based on the detected extended length.

However, the use of the previously described four-point seat belts may not guarantee the suitable restraint of passengers.

For example, there are cases in which the belt may reside on the upper area of the abdomen for passengers whose abdomen protrudes outwards. With the seat belt fastened in this way, there is a potential that the chest area above the abdomen will be significantly restrained while the area below the chest area will not be restrained when the seat belt is activated in the event of an accident or similar. Different from that of three-point seat belts, four-point seat belts are fastened in front of the passenger, and so the belts are loose and not positioned to the hips of the passenger when fastening the belts. For this reason, the passenger has to use their hands to hold and situate the hip belt toward their hips.

If the passenger is not of a body type in which the abdomen protrudes such that the belt resides on the upper area of the abdomen, it is still preferable to automatically restrain the passenger by pressing the hip belts to the hip without causing interference to the passenger.

In this way, the four-point seat belt device may adapt to passengers of various body types, and may restrain the body of the passenger without causing interference to the passenger.

SUMMARY OF THE INVENTION

The present technology aims to solve the above described problem by providing a four-point seat belt device that adjusts the position of the seat belt to the various body types of passengers and restrains the body of the passenger without slack in the hip belt.

An aspect of the present invention provides a four-point seat belt device including: two hip belts to press against the hip bone of a passenger sitting in a seat; two shoulder belts to press against both shoulders of the passenger; a drive unit to retract the belts; an engagement detection unit to detect the state in which the hip belts and the shoulder belts are engaged via a buckle; and a detection unit to detect that the hip belt is not making contact with the passenger. The engagement detection unit detects an engagement, and the drive unit retracts the hip belts when the detection unit detects that the hip belts are not making contact with the passenger.

The detection unit may be a bending moment detection unit to detect that the hip belts are not making contact by the angle, and the drive unit may retract the hip belts in response to a signal from a bending moment detection unit representing that the angle of the hip belts are within a predetermined range after the engagement detection unit detects an engagement.

The drive unit may establish an uncontrolled state regarding at least any one of the hip belts and the shoulder belts when the engagement detection unit detects an engagement, and afterwards retract the hip belts in response to a signal from a bending moment detection unit representing that the angle of the hip belts are within a predetermined range.

The drive unit may include a pulley and motor to retract the belt.

The drive unit may loosen the drive force applied to the belt of at least one motor regarding the hip belts and the shoulder belts, and afterwards retract the hip belts in response to a signal from a bending moment detection unit representing that the angle of the hip belts are within a predetermined range.

The drive unit may operate at any one state including the retract, retain, and uncontrolled state before the engagement detection unit detects an engagement, and the drive unit may retract any one of the hip belts and the shoulder belts in response to a signal from a bending moment detection unit representing that the angle of the hip belt is within a predetermined range, in the event that the engagement detection unit has detected an engagement.

DETAILED DESCRIPTION

Hereafter, a first implementation of the present technology will be described with reference to the drawings.

First Implementation

Figure 1:
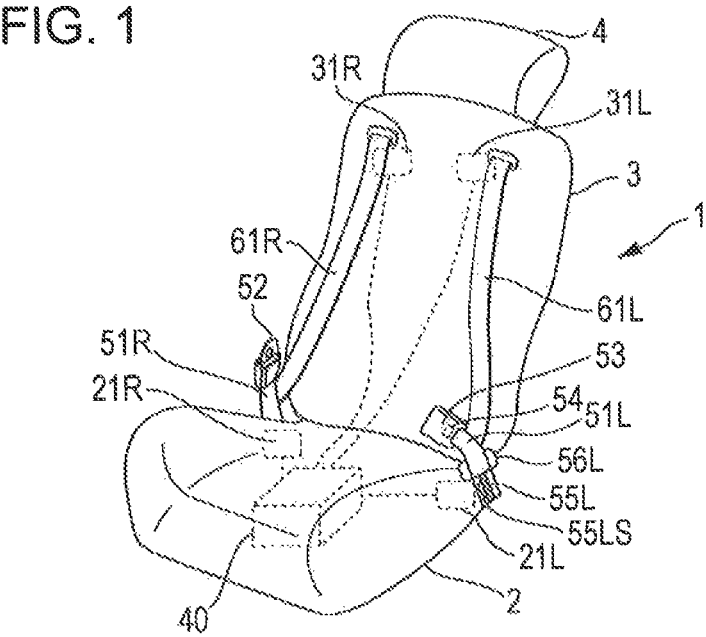
FIG. 1 is an overall perspective diagram of a four-point seat belt device according to a first implementation of the present technology.
Figure 2:
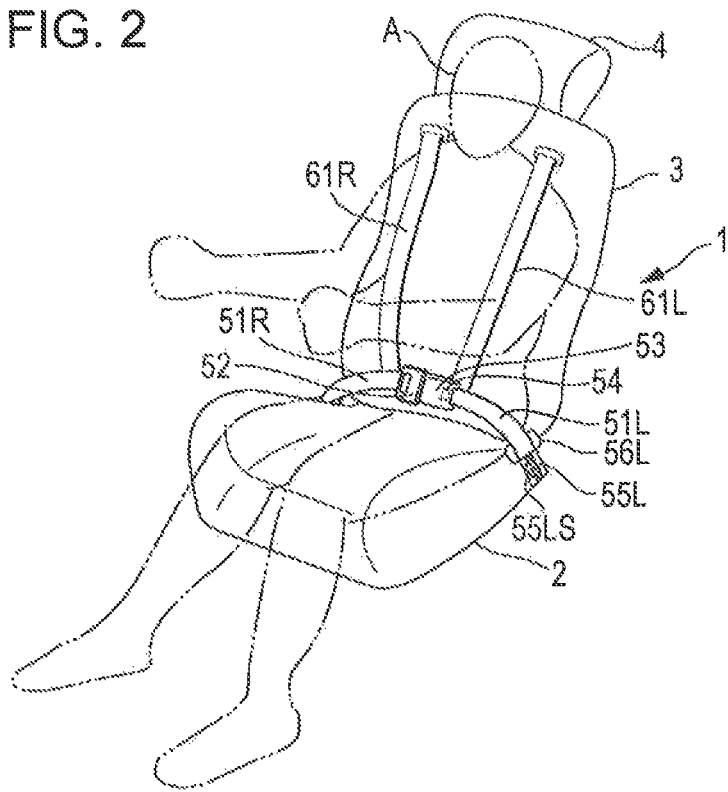
FIG. 2 is an overall perspective diagram of a passenger sitting in the four-point seat belt device according to the first implementation of the present technology.
Figure 3:
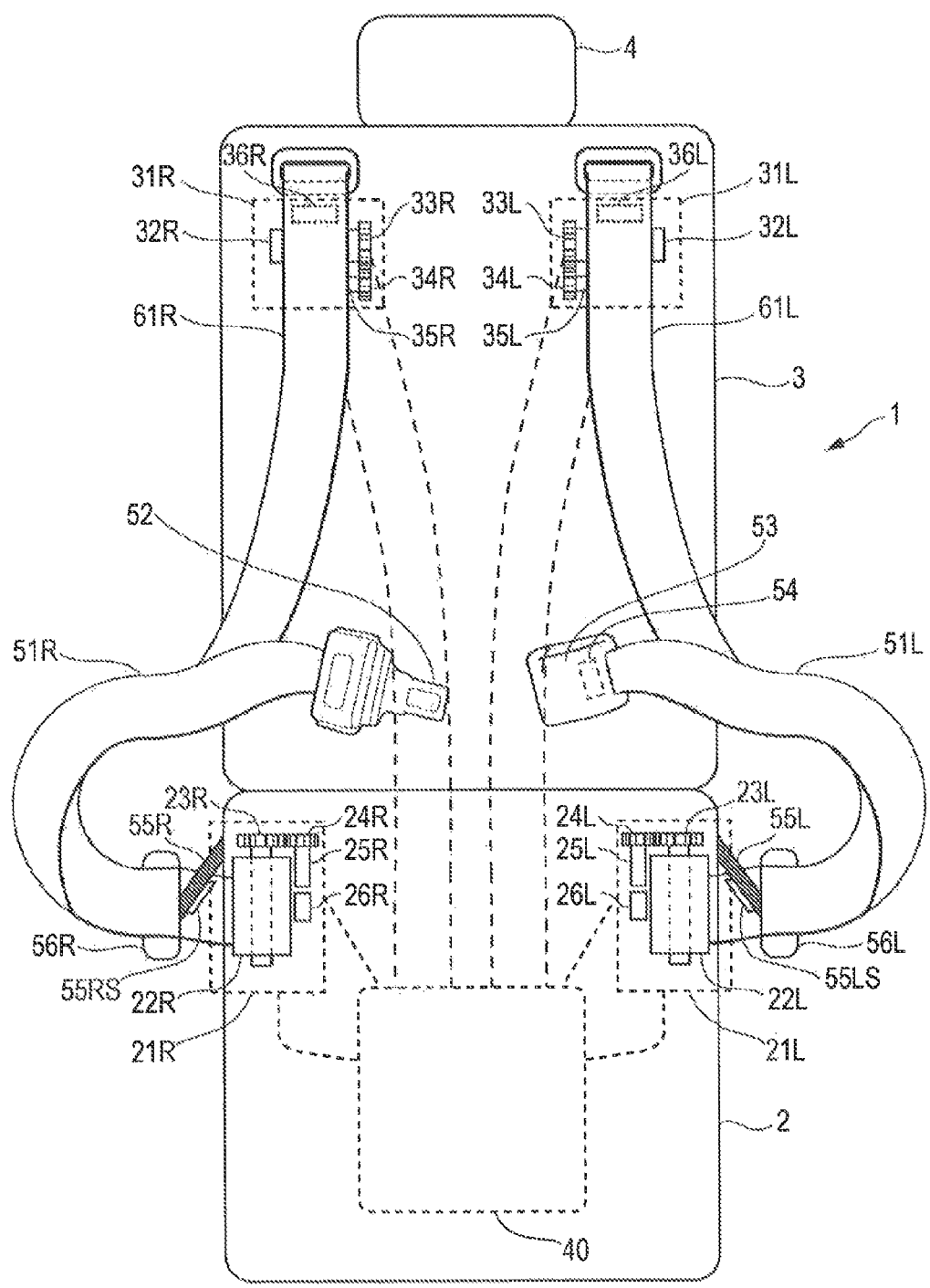
FIG. 3 is an overall front view of the four-point seat belt device according to the first implementation of the present technology.

FIGS. 1 through 8 illustrate the first implementation of the present technology. FIGS. 1 through 3 illustrate the basic configuration of the present technology. Thus, the basic configuration of the four-point seat belt device according to the present technology will be described first.

FIG. 1 is an overall perspective diagram of the four-point seat belt device according to the first implementation of the present technology.

The seat regarding a four-point seat belt device 1 according to the present technology is configured with a seat cushion 2 that passengers sit on and is made from a square cushion placed horizontally in relation to the vehicle, a seat back 3 arranged in a rectangular form nearly vertical to the seat cushion 2 positioned toward the back of the passenger, in which this angle in relation to the seat cushion 2 may be adjusted by the passenger, and a head cushion 4 made from a rectangular cushion and positioned on top of the seat back 3 to correspond to the head position of the passenger.

A right retractor 21R is provisioned as a drive unit to the right side of the seat cushion 2, which is the seat of the four-point seat belt device 1, and a right hip belt 51R is installed in the right retractor 21R to which it retracts and retains. The right hip belt 51R is secured by a right wire 55R (not illustrated in FIG. 1) and a right guide 56R (not illustrated in FIG. 1). A right bending moment sensor 55RS (not illustrated in FIG. 1), which is a bending moment detection unit, is installed in the right wire 55R (not illustrated in FIG. 1), and may measure the angle of the right wire 55R (not illustrated in FIG. 1). The right retractor 21R may also be provisioned more toward the center of the seat cushion 2 from the right side of the seat cushion 2.

A left retractor 21L is provisioned as a drive unit to the left side of the seat cushion 2, which is the seat of the four-point seat belt device 1, and a left hip belt 51L is installed in the left retractor 21L to which it retracts and retains. The left hip belt 51L is secured by a left wire 55L and a left guide 56L. The bending moment sensor 55RS is electrically connected to a control unit 40 described later. A left bending moment sensor 55LS, which is a bending moment detection unit, is installed in the left wire 55L, and may measure the angle of the left wire 55L. The left bending moment sensor 55LS is electrically connected to the control unit 40 described later. The left retractor 21L may also be provisioned more toward the center of the seat cushion 2 from the left side of the seat cushion 2. The bending moment detection unit is also used as a detection unit to detect, depending on the angle, that the passenger and hip belt have become separated.

The right hip belt 51R provisioned to be extendable is pulled out from the right retractor 21R and restrains the right hip of the passenger seated in the seat. A tongue plate 52 is provisioned on the end of the right hip belt 51R that is pulled out. The left hip belt 51L is provisioned to be extendable is pulled out from the left retractor 21L and restrains the left hip of the passenger seated in the seat. A buckle 53 is provisioned on the end of the left hip belt 51L that is pulled out.

The buckle 53 is provisioned with an engagement detection unit 54 as an engagement detection unit to detect the state in which the buckle 53 and the tongue plate 52 are engaged. The engagement detection unit 54 is electrically connected to the control unit 40 described later.

An upper-right retractor 31R and an upper-left retractor 31L are provisioned in the upper front side of the seat back 3 horizontal to each other. The upper-right retractor 31R is provisioned in a position nearly the same height as the shoulder of the passenger when the passenger is seated. A right shoulder belt 61R provisioned to be extendable is pulled out from the upper-right retractor 31R and restrains the right shoulder of the passenger seated in the seat. The end of the right shoulder belt 61R that is pulled out is connected to the right hip belt 51R.

The upper-left retractor 31L is provisioned in a position nearly the same height as the shoulder of the passenger when the passenger is seated. A left shoulder belt 61L provisioned to be extendable is pulled out from the upper-left retractor 31L and restrains the left shoulder of the passenger seated in the seat. The end of the left shoulder belt 61L that is pulled out is connected to the left hip belt 51L.

A configuration may also be employed in which the end of the right shoulder belt 61R that is pulled out connects with the tongue plate 52, and the end of the left shoulder belt 61L that is pulled out connects with the buckle 53. The upper-right retractor 31R may also be provisioned in either one of the roof and the pillar. The upper-left retractor 31L may also be provisioned in either one of the roof and the pillar.

The control unit 40 controls the right retractor 21R, which functions as a drive unit to retract the right hip belt 51R, the left retractor 21L, which functions as a drive unit to retract the left hip belt 51L, the upper-right retractor 31R, which functions as a drive unit to retract the right shoulder belt 61R, and the upper-left retractor 31L, which functions as the drive unit to retract the left shoulder belt 61L.

The control unit 40 is provisioned at either of beneath and in the seat of the seat cushion 2.

FIG. 2 is an overall perspective diagram of a passenger A sitting in the four-point seat belt device 1 according to the first implementation of the present technology.

The passenger A seats on the seat cushion 2 such that their back rests against the seat back 3. The head of the passenger A makes contact with the head cushion 4. The right shoulder belt 61R in FIG. 2 extends downward from the right shoulder of the passenger A. The left shoulder belt 61L extends downward from the left shoulder of the passenger A. The left hip belt 51L and the right hip belt 51R are engaged via the tongue plate 52 and the buckle 53, and extend around the hip area. This represents the ideal fastened state of the seat belt.

Next, the configuration of each component of the four-point seat belt device 1 will be described with reference to FIG. 3.

FIG. 3 is an overall front view of the four-point seat belt device 1 according to the first implementation of the present technology.

In order from the top down, the seat of the four-point seat belt device 1 is configured with the head cushion 4 that makes contact with the head of the passenger, the seat back 3 positioned toward the back of the passenger, and the seat cushion 2 in which the passenger sits.

The right retractor 21R is provisioned on the right side of the seat cushion 2. The right retractor 21R, which functions as a drive unit, is configured with a right pulley 22R and a right motor 25R to retract the right hip belt 51R. The right hip belt 51R is secured by the right wire 55R and the right guide 56R. The bending moment sensor 55RS is installed in the right wire 55R to measure the angle of the right wire 55R.

The left retractor 21L is provisioned on the left side of the seat cushion 2. The left retractor 21L, which functions as a drive unit, is configured with a left pulley 22L and a left motor 25L to retract the left hip belt 51L. The left hip belt 51L is secured by the left wire 55L and the left guide 56L. The bending moment sensor 55LS is installed in the left wire 55L to measure the angle of the left wire 55L.

The right retractor 21R includes the right pulley 22R to retract the right hip belt 51R, a right rotational gear 23R provisioned to the end of the right pulley 22R, a right motor gear 24R which engages with the right rotational gear 23R, the right motor 25R which rotates the right motor gear 24R, and a right sensor 26R to detect the extended length and tension of the right hip belt 51R.

Specifically, the right retractor 21R on the right side of the seat cushion 2 is configured so that the right rotational gear 23R provisioned on the end of the right pulley 22R engages with the right motor gear 24R of the right motor 25R in order to retract and extend the right hip belt 51R.

The right sensor 26R is provisioned to detect the extended length and tension of the right hip belt 51R. As a result, the right motor 25R actuates on the basis of information from the right sensor 26R to rotate the right pulley 22R. Therefore, the tension and extended length of the right hip belt 51R may be controlled.

As a result, the right retractor 21R functions as a drive unit that may loosen the tension or lengthen the length of the right hip belt 51R in the direction to which it is pulled, and also enables the state in which the length may be lengthened. The right retractor 21R retracts and retains the right hip belt 51R. The right retractor 21R does not retract or retain the right hip belt 51R during states when not under control.

The left retractor 21L includes the left pulley 22L to retract the left hip belt 51L, a left rotational gear 23L provisioned to the end of the left pulley 22L, a left motor gear 24L which engages with the left rotational gear 23L, the left motor 25L which rotates the left motor gear 24L, and a left sensor 26L to detect the extended length and tension of the left hip belt 51L.

Specifically, the left retractor 21L on the left side of the seat cushion 2 is configured so that the left rotational gear 23L provisioned on the end of the left pulley 22L engages with the left motor 25L and the left motor gear 24L in order to retract and extend the left hip belt 51L.

The left sensor 26L is provisioned to detect the extended length and tension of the left hip belt 51L. As a result, the left motor 25L actuates on the basis of information from the left sensor 26L to rotate the left pulley 22L. Therefore, the tension and extended length of the left hip belt 51L may be controlled.

As a result, the left retractor 21L functions as a drive unit that may loosen the tension or lengthen the length of the left hip belt 51L in the direction to which it is pulled, and also enables the state in which the length may be lengthened. The left retractor 21L retracts and retains the left hip belt 51L. The left retractor 21L does not retract or retain the left hip belt 51L during states when not under control.

The upper-right retractor 31R and the upper-left retractor 31L are provisioned in the upper-front side of the seat back 3 horizontal to each other. The upper-right retractor 31R is configured with an upper-right pulley 32R to retract the right shoulder belt 61R, an upper-right rotational gear 33R provisioned to the end of the upper-right pulley 32R, an upper-right motor gear 34R that engages with the upper-right rotational gear 33R, an upper-right motor 35R that rotates the upper-right motor gear 34R, and an upper-right sensor 36R to detect the extended length and tension of the right shoulder belt 61R. Specifically, the upper-right retractor 31R on the upper-right front side of the seat back 3 is configured so that the upper-right rotational gear 33R provisioned on the end of the upper-right pulley 32R engages with the upper-right motor gear 34R of the upper-right motor 35R to retract and extend the right shoulder belt 61R. The upper-right sensor 36R is provisioned to detect the extended length and tension of the right shoulder belt 61R. As a result, the upper-right motor 35R actuates on the basis of information from the upper-right sensor 36R to rotate the upper-right pulley 32R, which enables control of the tension and length of the right shoulder belt 61R. As a result, the upper-right retractor 31R functions as a drive unit that may loosen the tension or lengthens the length of the right shoulder belt 61R in the retracting direction, and also enables the state in which the length may be lengthened. The upper-right retractor 31R retracts and retains the right shoulder belt 61R. The upper-right retractor 31R does not retract or retain the right shoulder belt 61R during states when not under control.

The upper-left retractor 31L is configured with an upper-left pulley 32L to retract the left shoulder belt 61L, an upper-left rotational gear 33L provisioned to the end of the upper-left pulley 32L, an upper-left motor gear 34L that engages with the upper-left rotational gear 33L, an upper-left motor 35L that rotates the upper-left motor gear 34L, and an upper-left sensor 36L to detect the extended length and tension of the left shoulder belt 61L. Specifically, the upper-left retractor 31L on the upper-left front side of the seat back 3 is configured so that the upper-left rotational gear 33L provisioned on the end of the upper-left pulley 32L engages with the upper-left motor gear 34L of the upper-left motor 35L to retract and extend the left shoulder belt 61L. The upper-left sensor 36L is provisioned to detect the extended length and tension of the left shoulder belt 61L. As a result, the upper-left retractor 31L functions as a drive unit that may loosen the tension or lengthen the length of the left shoulder belt 61L in the retracting direction, and also enables the state in which the length may be lengthened. The upper-left retractor 31L does not retract or retain the left shoulder belt 61L during states when not under control.

The tongue plate 52 is provisioned to the end of the right hip belt 51R that is pulled out, and the buckle 53 is provisioned to the end of the left hip belt 51L that is pulled out. The buckle 53 is provisioned with the engagement detection unit 54 to detect the engagement of the buckle 53 and the tongue plate 52. In response to the signal from the engagement detection unit 54, the control unit 40 controls any of at least one of the right retractor 21R, the left retractor 21L, the upper-right retractor 31R, and the upper-left retractor 31L, which all function as drive units, to loosen the tension or lengthen the length of any of at least the right hip belt 51R, the left hip belt 51L, the right shoulder belt 61R, and the left shoulder belt 61L in the direction to which it pulled, or temporarily loosen the right hip belt 51R and the left hip belt 51L to enable the state in which the length may be lengthened.

The control unit 40 is provisioned at either of underneath and inside the seat of the seat cushion 2. The control unit 40 is connected electrically to and sends/receives signals to/from each of the right motor 25R and the right sensor 26R in the right retractor 21R, which is a drive unit, the left motor 25L and the left sensor 26L in the left retractor 21L, which is a drive unit, the upper-right motor 35R and the upper-right sensor 36R in the upper-right retractor 31R, which is a drive unit, the upper-left motor 35L and the upper-left sensor 36L in the upper-left retractor 31L, which is a drive unit, the engagement detection unit 54, the right bending moment sensor 55RS, and the left bending moment sensor 55LS. The electrical connection may be either of a wired connection and a wireless connection.

The two dotted lines from the right retractor 21R to the control unit 40 in FIG. 3 represent each electrical connection from the control unit 40 to the right motor 25R and to the right sensor 26R, and the two dotted lines from the left retractor 21L to the control unit 40 represent each electrical connection from the control unit 40 to the left motor 25L and the left sensor 26L. The two dotted lines from the upper-right retractor 31R to the control unit 40 represent each electrical connection from the control unit 40 to the upper-right motor 35R and to the upper-right sensor 36R, and the two dotted lines from the upper-left retractor 31L to the control unit 40 represent each electrical connection from the control unit 40 to the upper-left motor 35L and to the upper-left sensor 36L.

Figure 4:
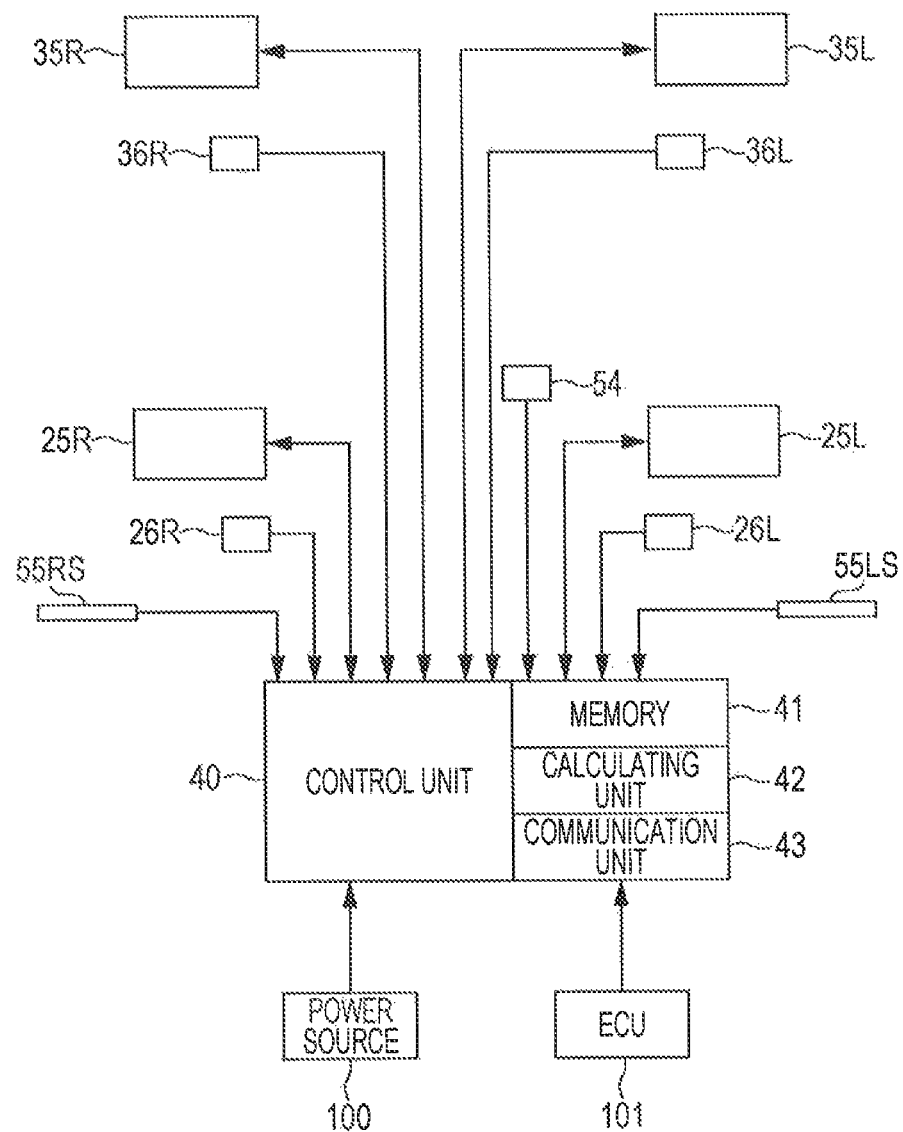
FIG. 4 is a block configuration diagram of the four-point seat belt device according to the first implementation of the present technology.
Figure 5:
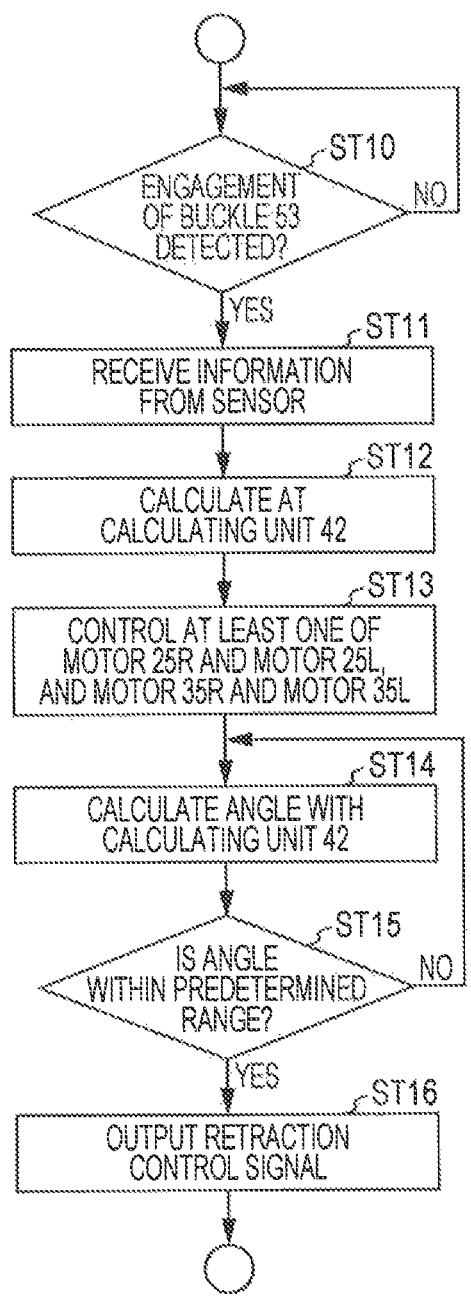
FIG. 5 is a flowchart regarding the four-point seat belt device according to the first implementation of the present technology.
Figure 6:
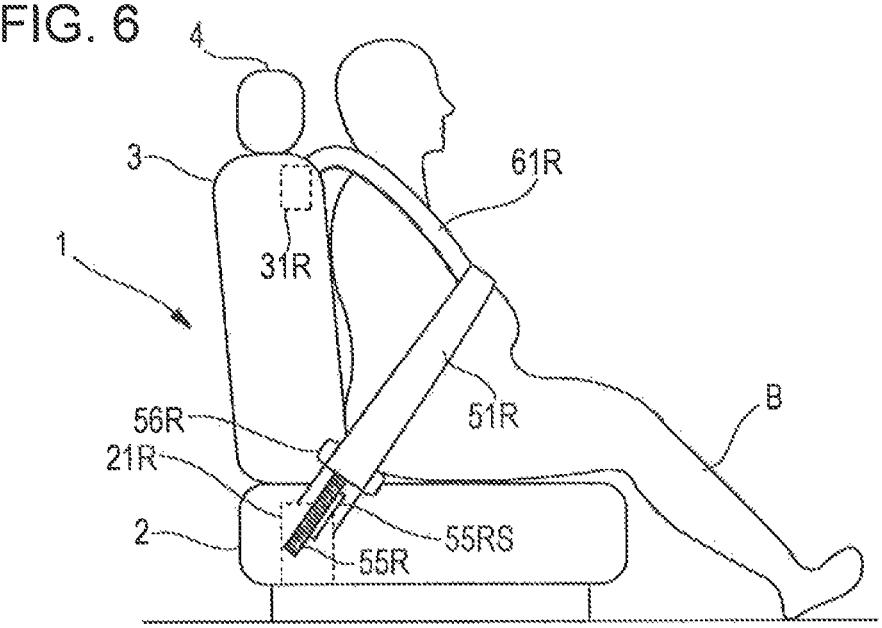
FIG. 6 is a diagram of the operation state when looking from the side view regarding the four-point seat belt device according to the first implementation of the present technology.
Figure 7:
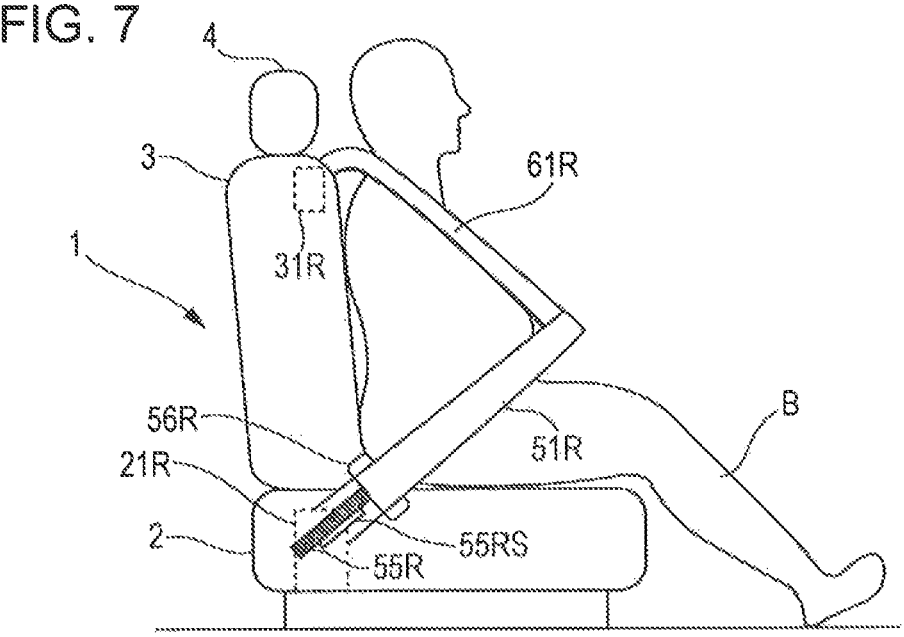
FIG. 7 is a diagram of the operation state when looking from the side view regarding the four-point seat belt device according to the first implementation of the present technology.
Figure 8:
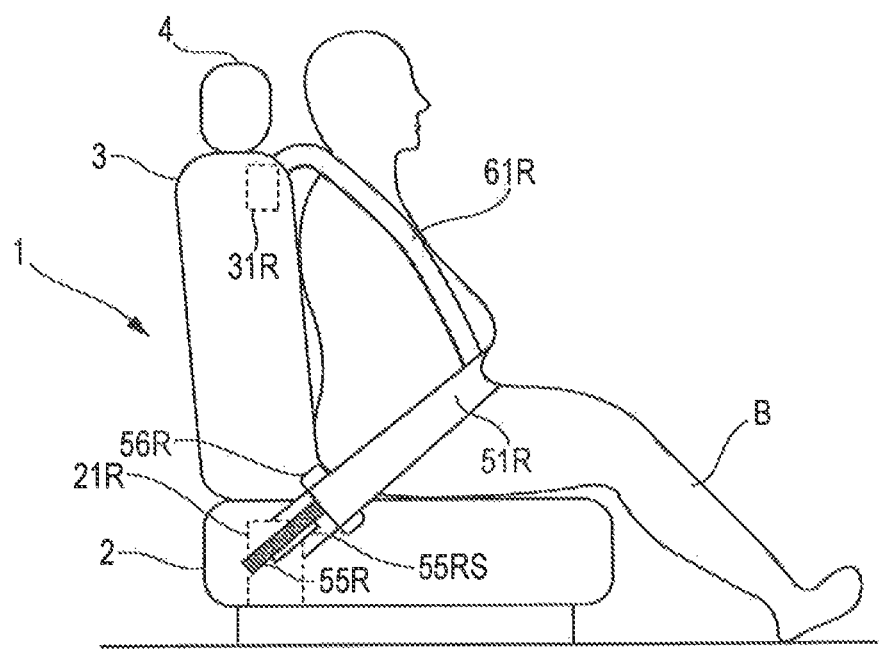
FIG. 8 is a diagram of the operation state when looking from the side view regarding the four-point seat belt device according to the first implementation of the present technology.

The operation of the four-point seat belt device 1 according to the first implementation of the present technology will be described with reference to FIGS. 4 through 8. FIG. 4 is a block configuration diagram of the four-point seat belt device 1 according to the first implementation of the present technology. FIG. 5 is a flowchart regarding the four-point seat belt device 1 according to the first implementation of the present technology. FIGS. 6 through 8 are diagrams of the operational state as seen from the side regarding the four-point seat belt device 1 according to the first implementation of the present technology. The configurations in FIGS. 6 through 8 that are the same as those in FIG. 1 through 3 use the same reference numerals as those used in FIGS. 1 through 3, and so their descriptions are omitted.

With a focus on the control unit 40, the configurations of components connected to the control unit 40 will first be described with reference to FIG. 4. The control unit 40 is configured with a memory 41, a calculating unit 42, and a communication unit 43. The control unit 40 operates from the supply of electrical power received from a power source 100 such as a vehicle battery. The control unit 40 is electrically connected to an electronic control unit (ECU) 101 in the vehicle, obtains information from other control units in the vehicle, and in response to this information the control unit 40 may then control the four-point seat belt device and send information on the four-point seat belt device 1 addressed to the other control units in the vehicle to the ECU 101. For example, the four-point seat belt device 1 is controlled in response to a collision detection signal.

The memory 41 stores information for estimating the body type from the length and tension of the right hip belt 51R, the left hip belt 51L, the right shoulder belt 61R, and the left shoulder belt 61L, and information such as body type information on a passenger B. The calculating unit 42 performs calculations based on the information on the length and tension of the right hip belt 51R, left hip belt 51L, the right shoulder belt 61R, and the left shoulder belt 61L. The communication unit 43 performs communications with the right motor 25R, the left motor 25L, the right sensor 26R, the left sensor 26L, the upper-right motor 35R, the upper-left motor 35L, the upper-right sensor 36R, the upper-left sensor 36L, the engagement detection unit 54, the bending moment sensor 55RS, the left bending moment sensor 55LS, and the ECU 101.

Next, an overview of the operation of the four-point seat belt device 1 will be described. When the tongue plate and buckle which secure the seat belt are connected, either one of a conductive sensor and compression switch verifies that the seat belt is in a secured state. At this time, the hip belt is moved to the front of the vehicle using an actuator (such as a piston), for example, to separate the hip belt from making contact with the passenger. This contact with the passenger is detected from a detection value from a bending moment sensor provisioned to measure the bending moment and tension in a wire. At this time, the seat belt retraction device rotates in reverse so that the seat belt does not interfere with driver operation. The seat belt is moved downward to prevent contact with the passenger. The bending moment sensor detects that the hip belt is not making contact with the passenger in this lowered state at this time. If there is a detection that contact is being made between the passenger and the hip belt, the hip belt is moved by the operation of an actuator (such as a piston) to separate the belt from making contact with the passenger. The confirmation that the hip belt is moved to a position near the hip is made by a detection from the bending moment sensor that the hip belt has made contact with the thigh of the passenger. When there is a detection that the hip belt made contact with the thigh of the passenger, the actuator (such as a piston) moves the hip belt to the hip bone. A tension sensor in the actuator (such as a piston) detects that the hip belt made contact with the hip bone. When there is a detection that the hip belt made contact with the hip bone, the seat belt retraction device is used to remove the slack so that the belt is not loose (for example, using an actuator such as a piston). The suitable amount of tension in the seat belt is measured by a sensor in the seat belt retraction device. This device works in conjunction with a collision sensor to determine when to extend the seat belt due to passenger movement within the cabin and to determine when to restrain the seat belt in collisions. This device is also configured to not inhibit extension of the seat belt due to passenger movement within the cabin. The control to remove the slack from the seat belt is performed again at certain time intervals when the passenger remains in a fixed posture. As a result, this enables a belt engagement position that fits individual body types, and also may remove manual adjustments of the belt by the passenger after the seat belt is engaged. This also removes any undesirable slack in the belt, which improves restraining performance during a collision.

Next, an example operation of the four-point seat belt device 1 will be described with reference to the flowchart in FIG. 5 regarding the four-point seat belt device 1 according to the first implementation of the present technology. The passenger B with a protruding abdomen sits in the seat cushion 2, and pulls the right hip belt 51R from the right retractor 21R on the right side of the seat. The passenger B pulls the left hip belt 51L from the left retractor 21L on the left side of the seat. The passenger B engages the tongue plate 52 provisioned on the end of the right hip belt 51R that is pulled out with the buckle 53 provisioned on the end of the 51 that is pulled out. The engagement detection unit 54 detects that the tongue plate 52 and the buckle 53 are engaged, and outputs a signal to the control unit 40 (step ST10). Before the detection by the engagement detection unit 54, the right retractor 21R, the left retractor 21L, the upper-right retractor 31R, and the upper-left retractor 31L, which are drive units, are in anyone of a retracted, retained, and uncontrolled state.

As illustrated in FIG. 6, when the passenger B with the protruding abdomen engages the tongue plate 52 and the buckle 53, the right hip belt 51R and the left hip belt 51L which are now connected by the engagement of the tongue plate 52 and the buckle 53 move to the upper area of the abdomen of the passenger B. The frame of the passenger B is not restrained in this state.

The communication unit 43 receives information on the tension applied to each belt and the extended length of each belt from the right sensor 26R in the right motor 25R of the right hip belt 51R, the left sensor 26L in the left motor 25L of the left hip belt 51L, the upper-right sensor 36R in the upper-right motor 35R of the right shoulder belt 61R, and the upper-left sensor 36L in the upper-left motor 35L of the left shoulder belt 61L (step ST11).

The calculating unit 42 in the control unit 40 performs calculations based on the information on the extended length and tension (step ST12). Next, the control unit 40 controls the length and tension of the belts by sending a signal via the communication unit 43 to any of at least one of the right motor 25R which controls the extended length and tension of the right hip belt 51R by drive force, the left motor 25L which controls the extended length and tension of the left hip belt 51L by drive force, the upper-right motor 35R which controls the extended length and tension of the right shoulder belt 61R by drive force, and the upper-left motor 35L which control the extended length and tension of the left shoulder belt 61L by drive force (step ST13).

As illustrated in FIG. 7, for example, a control signal is output to the right motor 25R and the left motor 25L to loosen the tension in the retracting direction or lengthen the length regarding the right hip belt 51R and the left hip belt 51L. An uncontrolled state may be established by outputting a control signal to the upper-right motor 35R and the upper-left motor 35L to loosen the tension in the retracting direction or lengthen the length regarding the right shoulder belt 61R and the left shoulder belt 61L. As a result, the seat belt (right hip belt 51R, left hip belt 51L, right shoulder belt 61R, and left shoulder belt 61L) may be readily lengthened or the state in which the seat belt may be lengthened may be readily established. As a result, the seat belt may be readily positioned to the front of abdomen of the passenger. The right hip belt 51R and the left hip belt 51L is lowered downward by the weight of the buckle 53 when the seat belt is lengthened and loosened.

Next, the calculating unit 42 calculates the angle of the right wire 55R and the angle of the left wire 55L in response to the signal from the bending moment sensor 55RS and the left bending moment sensor 55LS (step ST14). The control unit 40 determines whether or not the angle of the right wire 55R and the angle of the left wire 55L are within a predetermined range (step ST15). If the angle of the right wire 55R and the left wire 55L are outside the predetermined range, the processing returns to the step ST14 and the angle of the right wire 55R and the angle of the left wire 55L are measured again. If the angle of the right wire 55R and the angle of the left wire 55L are within the predetermined range, this represents that the right hip belt 51R and the left hip belt 51L are in suitable positions to restrain the hip of the passenger B, and a retraction control signal is output to retract the right hip belt 51R and the left hip belt 51L (step ST16).

The control unit 40 outputs a control signal to any of at least the right motor 25R, the left motor 25L, the upper-right motor 35R, and the upper-left motor 35L. As a result, the right hip belt 51R, the left hip belt 51L, the right shoulder belt 61R, and the left shoulder belt 61L are retracted, and as illustrated in FIG. 8, the right hip belt 51R and the left hip belt 51L are below the abdomen of the passenger B so that the belts may provide restraint by pressing against the hip bone.

Second Implementation

Figure 9:
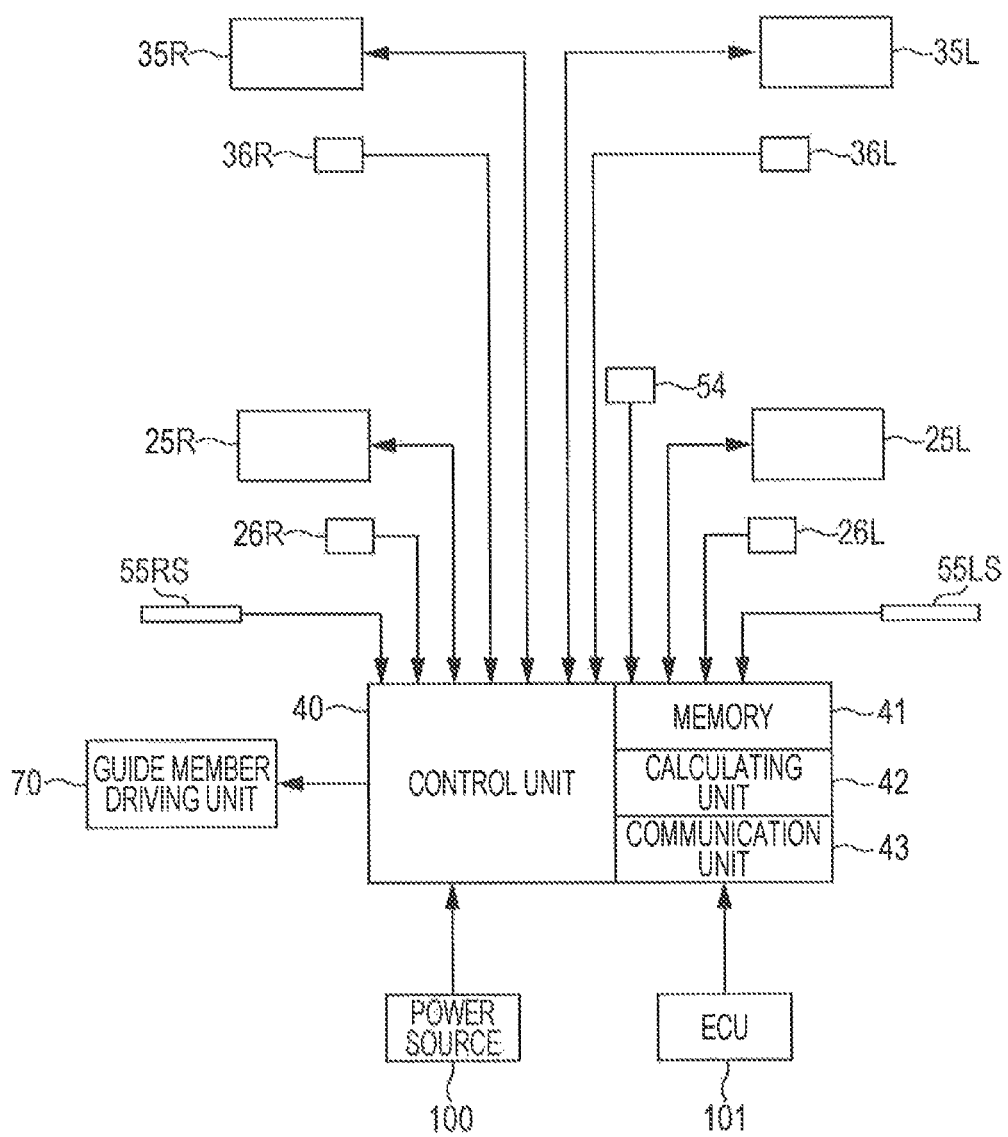
FIG. 9 is a block configuration diagram of the four-point seat belt device according to a second implementation of the present technology.
Figure 10:
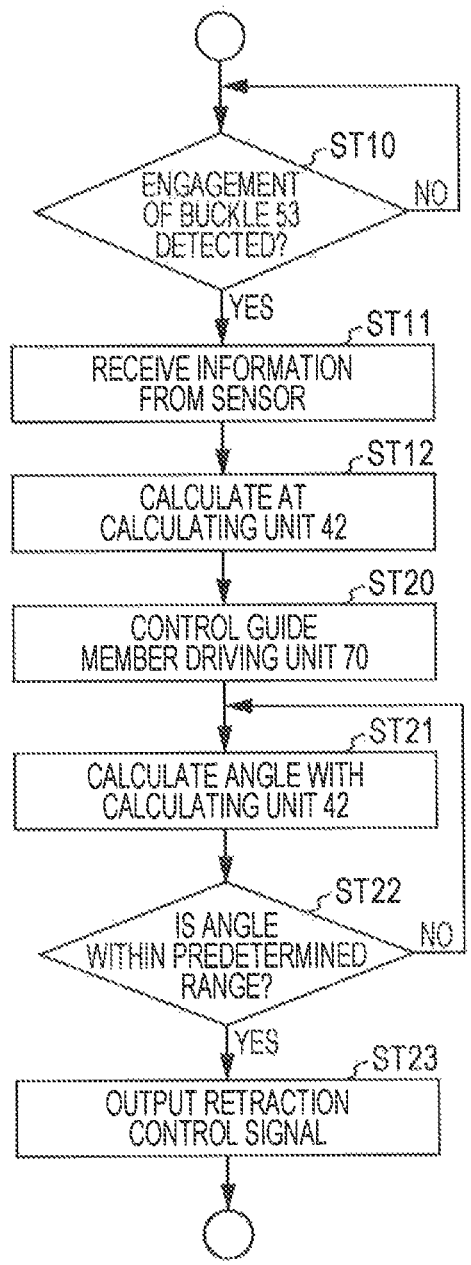
FIG. 10 is a flowchart regarding the four-point seat belt device according to the second implementation of the present technology.
Figure 11:
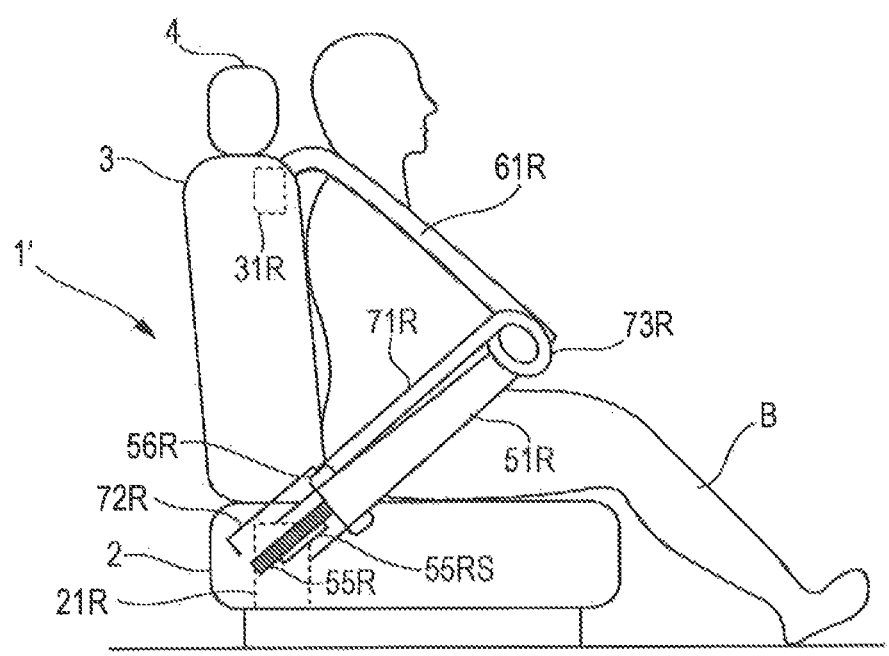
FIG. 11 is a diagram of the operation state when looking from the side view regarding the four-point seat belt device according to the second implementation of the present technology.

FIGS. 9 through 11 illustrate a second implementation of the present technology. The four-point seat belt device according to the second implementation of the present technology will be described with reference to FIGS. 9 through 11.

FIG. 9 is a block configuration diagram of the four-point seat belt device according to the second implementation of the present technology. FIG. 10 is a flowchart regarding the four-point seat belt device according to the second implementation of the present technology. FIG. 11 is a diagram of the operational state as seen from the side regarding the four-point seat belt device according to the second implementation of the present technology. This configuration uses the same reference numerals used in FIGS. 1 through 3 regarding the first implementation for those portions that are the same as the first implementation.

The configuration in FIG. 9 is the same configuration as that in FIG. 4, and so uses the same reference numerals as those used in FIG. 4, thus their descriptions are omitted. The configuration in FIG. 11 is the same as the configurations in FIGS. 6 through 8, and so uses the same reference numerals as those used in FIGS. 6 through 8, thus their descriptions are omitted.

A four-point seat belt device 1' according to the second implementation of the present technology is provisioned with a right guide member 71R to maintain a state in which the right hip belt 51R is separated from the seat, in which a lower unit 72R is the end of the right hip belt 51R and installed in the right retractor 21R. An upper unit 73R of the right guide member 71R guides the right hip belt 51R to be pulled out toward the front of the passenger B regarding the area near the end of the tongue plate 52 of the right hip belt 51R, and thus supports the right hip belt 51R. The right guide member 71R has a configuration that is elastic and operates in response to the engagement of the tongue plate 52 and the buckle 53. According to the second implementation, the configuration includes on the right guide member 71R, but a guide member may be provisioned on both the left and right sides of the four-point seat belt device 1'.

First, an overview of the operation of the four-point seat belt device 1' will be described. When the tongue plate and buckle which secure the seat belt are connected, either one of a conductive sensor and compression switch verifies that the seat belt is in a secured state. A control is executed to imperatively move the hip belt downward in response to an on signal from either one of the conductive sensor and compression switch. For example, the hip belt is imperatively moved downward by the guide member. At this time, the seat belt retraction device rotates in reverse to extend the seat belt so as to not cause interference with the imperative moving operation. The confirmation that the hip belt is moved to a position near the hip bone is made by a detection from the bending moment sensor that the hip belt has made contact with the thigh of the passenger. When there is a detection that the hip belt is moved to the position of the hip bone, which is directly above the thigh, the seat belt retraction device is used to remove the slack so that the belt is not loose (for example, using an actuator such as a piston). The suitable amount of tension in the seat belt is measured by a sensor in the seat belt retraction device. This device works in conjunction with a collision sensor to determine when to extend the seat belt due to passenger movement with the cabin and to determine when to restrain the seat belt in collisions. This device is also configured to not inhibit extension of the seat belt due to passenger movement within the cabin. The control to remove the slack from the seat belt is performed again at certain time intervals when the passenger remains in a fixed posture.

Next, an example operation of the four-point seat belt device 1' according to the second implementation of the present technology will be described with reference to the flowchart in FIG. 10. The passenger B with a protruding abdomen sits in the seat cushion 2, and pulls the right hip belt 51R from the right retractor 21R on the right side of the seat. The passenger B pulls the left hip belt 51L from the left retractor 21L on the left side of the seat. The passenger B engages the tongue plate 52 provisioned on the end of the right hip belt 51R that is pulled out with the buckle 53 on the end of the left hip belt 51L that is pulled out. The engagement detection unit 54 detects the engagement of the tongue plate 52 and the buckle 53, and outputs a signal to the control unit 40 (step ST10). Before the detection by the engagement detection unit 54, the right retractor 21R, the left retractor 21L, the upper-right retractor 31R, and the upper-left retractor 31L, which are drive units, are in any one of a retracted, restrained, and uncontrolled state.

As illustrated in FIG. 6, when the passenger B with the protruding abdomen engages the tongue plate 52 and the buckle 53, the right hip belt 51R and the left hip belt 51L which are now connected by the engagement of the tongue plate 52 and the buckle 53 move to the upper area of the abdomen of the passenger B. The body of the passenger B is not restrained in this state.

The communication unit 43 receives information on the tension applied to each belt and the extended length of each belt from the right sensor 26R in the right motor 25R of the right hip belt 51R, the left sensor 26L in the left motor 25L of the left hip belt 51L, the upper-right sensor 36R in the upper-right motor 35R of the right shoulder belt 61R, and the upper-left sensor 36L in the upper-left motor 35L of the left shoulder belt 61L (step ST11).

The calculating unit 42 of the control unit 40 performs calculations based on the information on the extended length and the tension (step ST12). The control unit 40 sends a control signal to a guide member drive unit 70 on the basis of the information from the 42 (step ST20).

As illustrated in FIG. 11, for example, the right guide member 71R elongates at a state in which the tongue plate 52 provisioned of the end of the right hip belt 51R in the direction pulled out is engaged with the buckle 53 provisioned on the end of the left hip belt 51L in the direction pulled out so that the right hip belt 51R and the left hip belt 51L may be positioned in front of and below the abdomen of the passenger B.

Next, the calculating unit 42 calculates the angle of the right wire 55R and the angle of the left wire 55L in response to the signal from the bending moment sensor 55RS and the left bending moment sensor 55LS (step ST21). The control unit 40 determines whether or not the angle of the right wire 55R and the angle of the left wire 55L are within a predetermined range (step ST22). If the angle of the right wire 55R and the left wire 55L are outside the predetermined range, the processing returns to the step ST14 and the angle of the right wire 55R and the angle of the left wire 55L are measured again. If the angle of the right wire 55R and the angle of the left wire 55L are within the predetermined range, this represents that the right hip belt 51R and the left hip belt 51L are in suitable positions to restrain the hip of the passenger B, and a retraction control signal is output to retract the right hip belt 51R and the left hip belt 51L (step ST23).

The control unit 40 outputs a control signal to any of at least the right motor 25R, the left motor 25L, the upper-right motor 35R, and the upper-left motor 35L. As a result, the right hip belt 51R, the left hip belt 51L, the right shoulder belt 61R, and the left shoulder belt 61L are retracted, and as illustrated in FIG. 8, the right hip belt 51R and the left hip belt 51L are below the abdomen of the passenger B so that the belts may provide restraint by pressing against the hip bone.

Third Implementation

FIGS. 12 through 16 illustrate a third implementation of the present technology. The four-point seat belt device according to the third implementation of the present technology will be described with reference to FIGS. 12 through 16.

Figure 12:
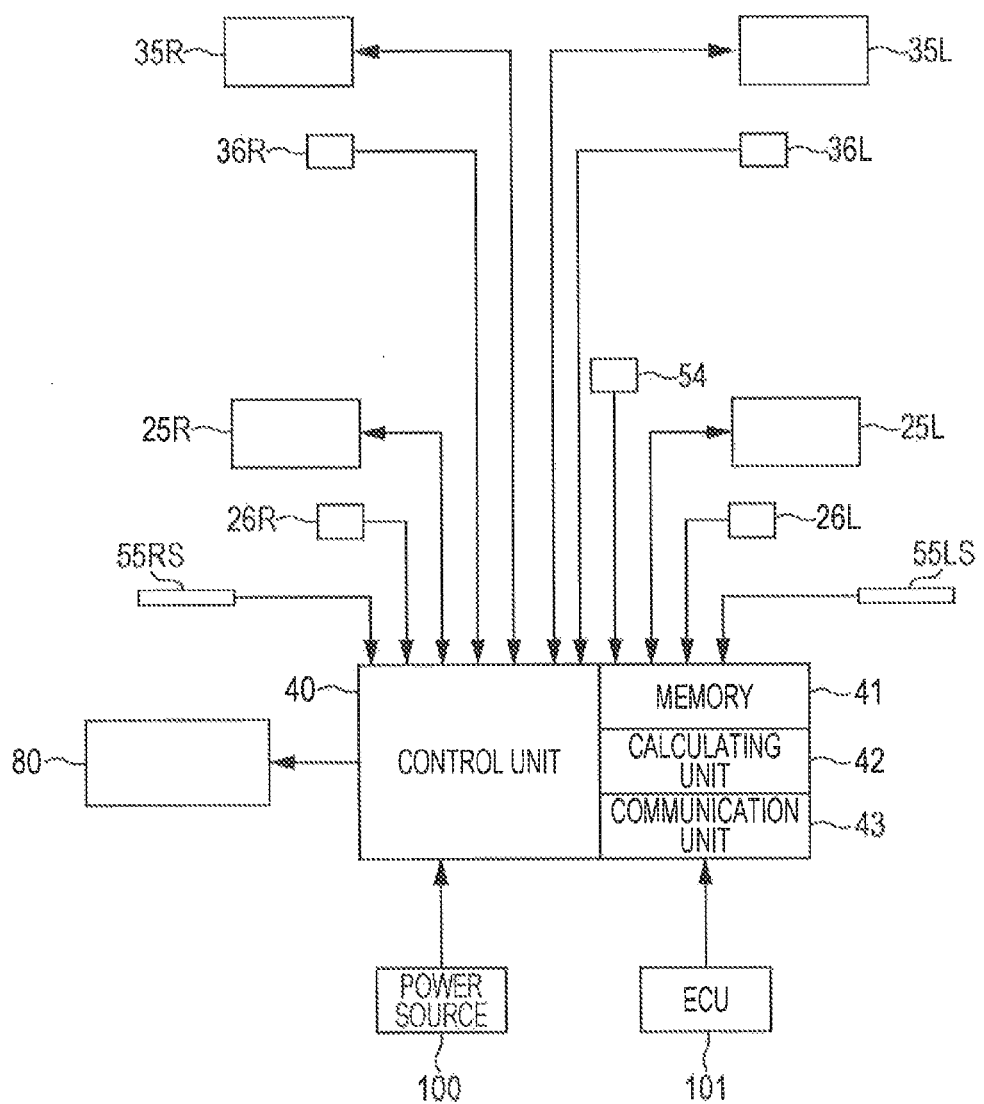
FIG. 12 is a block configuration diagram of the four-point seat belt device according to a third implementation of the present technology.
Figure 13:
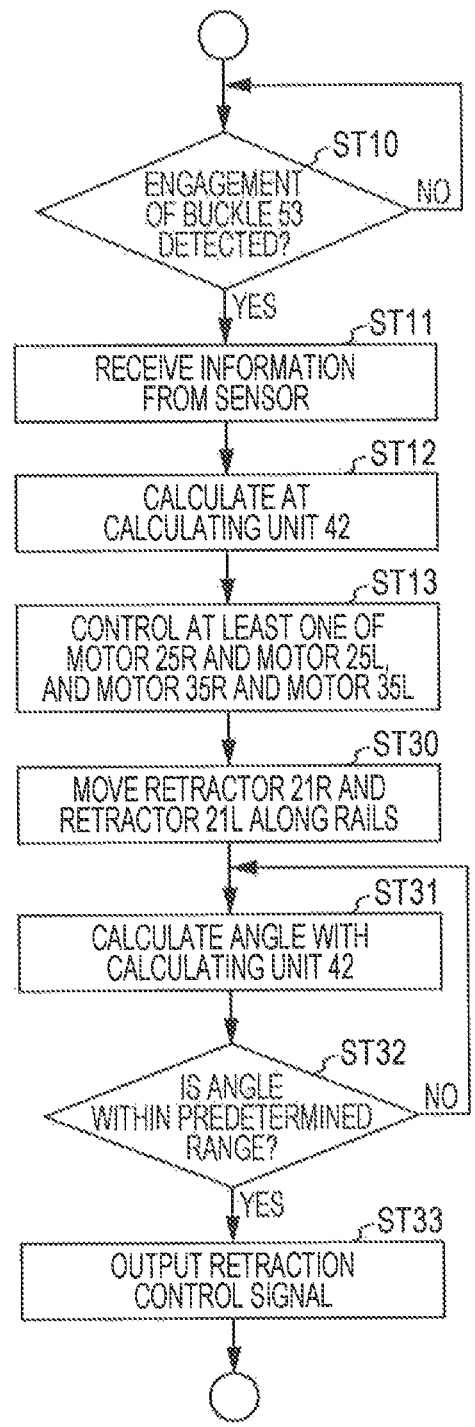
FIG. 13 is a flowchart regarding the four-point seat belt device according to the third implementation of the present technology.
Figure 14:
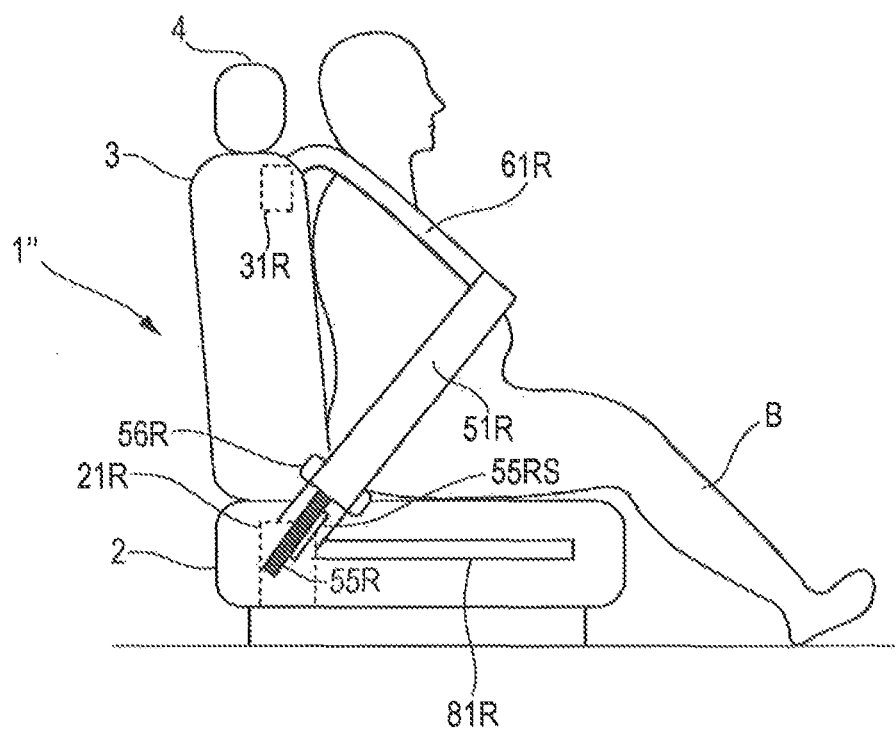
FIG. 14 is a diagram of the operation state when looking from the side view regarding the four-point seat belt device according to the third implementation of the present technology.
Figure 15:
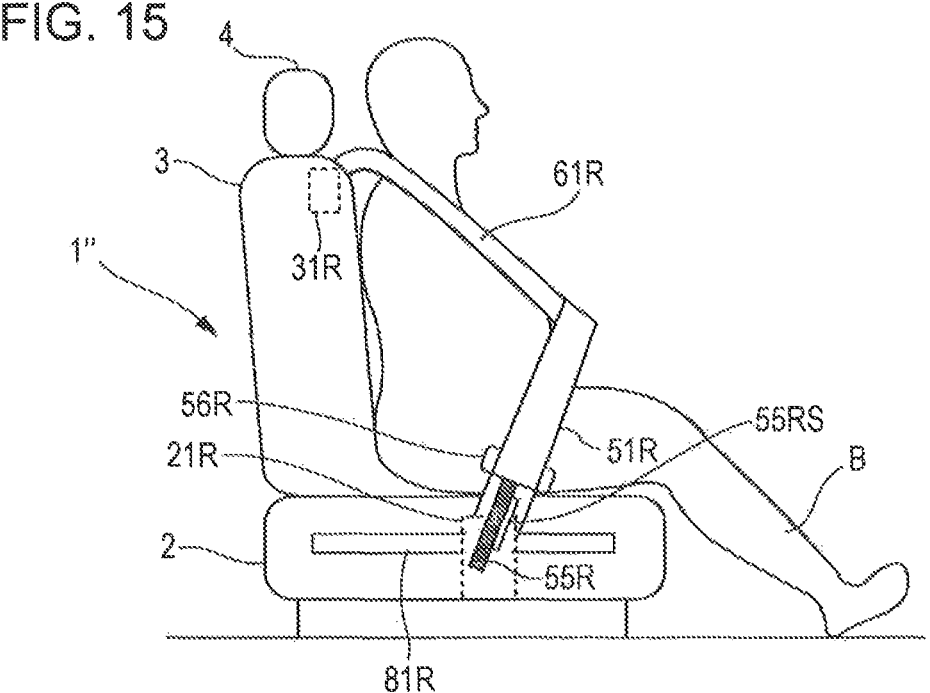
FIG. 15 is a diagram of the operation state when looking from the side view regarding the four-point seat belt device according to the third implementation of the present technology.
Figure 16:
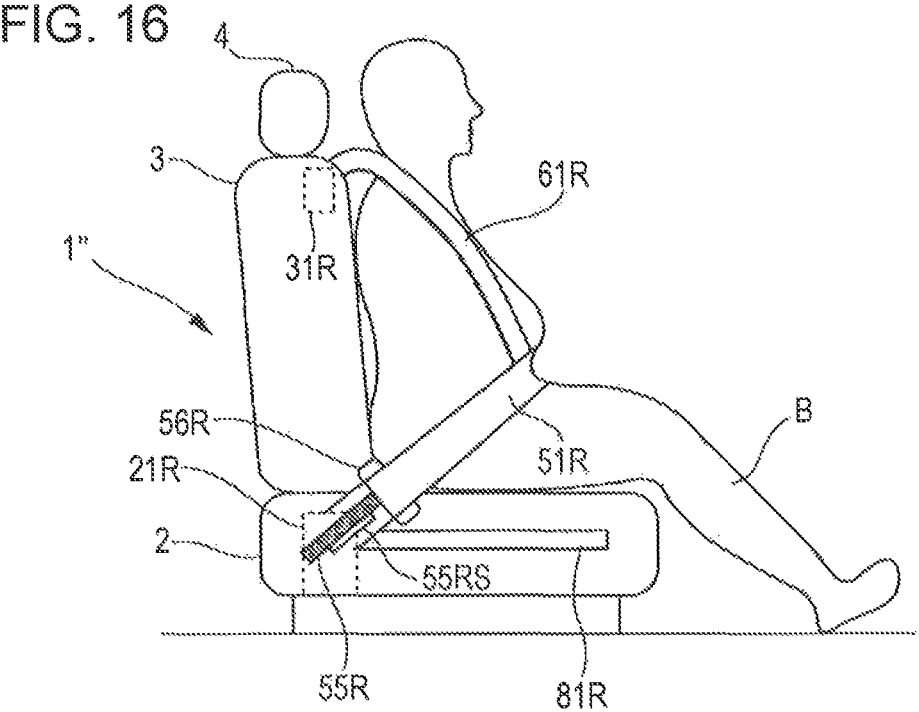
FIG. 16 is a diagram of the operation state when looking from the side view regarding the four-point seat belt device according to the third implementation of the present technology.

FIG. 12 is a block configuration diagram of the four-point seat belt device according to the third implementation of the present technology. FIG. 13 is a flowchart regarding the four-point seat belt device according to the third implementation of the present technology. FIGS. 14 through 16 are diagrams of the operational state as seen from the side regarding the four-point seat belt device according to the third implementation of the present technology. This configuration uses the same reference numerals used in FIGS. 1 through 3 regarding the first implementation for those portions that are the same as the first implementation.

The configuration in FIG. 12 is the same configuration as that in FIG. 4, and so uses the same reference numerals as those used in FIG. 4, thus their descriptions are omitted. The configurations in FIGS. 14 through 16 are the same as the configurations in FIGS. 6 through 8, and so uses the same reference numerals as those used in FIGS. 6 through 8, thus their descriptions are omitted.

A four-point seat belt device 1" according to the third implementation of the present technology is provisioned with a right hip belt transfer rail 81R to move the right retractor 21R which functions as a drive unit together with the right hip belt 51R forward and backward in relation to the vehicle along the right side of the seat cushion 2. The four-point seat belt device 1" is also provisioned with a left hip belt transfer rail to move the left retractor 21L which functions as a drive unit together with the left hip belt 51L forward and backward in relation to the vehicle along the left side of the seat cushion 2. The right hip belt transfer rail 81R and left hip belt transfer rail may provide drive force in synchronization, or may provide drive force independently. According to the present implementation, the right hip belt transfer rail 81R and the left hip belt transfer rail 81L move the right retractor 21R, the left retractor 21L, the right wire 55R, and the left wire 55L together in synchronization forward and backward.

First, an overview of the operation of the four-point seat belt device 1" will be described. When the tongue plate and buckle which secure the seat belt are connected, either one of a conductive sensor and compression switch verifies that the seat belt is in a secured state. A control is executed to loosen the hip belt in response to an on signal from either one of the conductive sensor and compression switch. For example, the hip belt transfer unit moves the hip belt forward along the hip belt transfer rail to loosen the hip belt. The seat belt retraction device is provisioned with a sensor to detect the tension in the seat belt. This sensor monitors for the falling of any of the tongue plate, the buckle, and the hip belt due to their weight. This is detected by the sudden looseness in the tension of the seat belt when the hip belt makes contact with the thigh of the passenger. Next, the seat belt retraction device is used to remove the slack so that the belt is not loose (for example, using an actuator such as a piston). The suitable amount of tension in the seat belt is measured by a sensor in the seat belt retraction device. This device works in conjunction with a collision sensor to determine when to extend the seat belt due to passenger movement with the cabin and to determine when to restrain the seat belt in collisions. This device is also configured to not inhibit extension of the seat belt due to passenger movement within the cabin. The control to remove the slack from the seat belt is performed again at certain time intervals when the passenger remains in a fixed posture.

Next, an example operation of the four-point seat belt device 1" according to the third implementation of the present technology will be described with reference to the flowchart in FIG. 13. The passenger B with a protruding abdomen sits in the seat cushion 2, and pulls the right hip belt 51R from the right retractor 21R on the right side of the seat. The passenger B pulls the left hip belt 51L from the left retractor 21L on the left side of the seat. The passenger B engages the tongue plate 52 provisioned on the end of the right hip belt 51R that is pulled out with the buckle 53 on the end of the left hip belt 51L that is pulled out. The engagement detection unit 54 detects the engagement of the tongue plate 52 and the buckle 53, and outputs a signal to the control unit 40 (step ST10). Before the detection by the engagement detection unit 54, the right retractor 21R, the left retractor 21L, the upper-right retractor 31R, and the upper-left retractor 31L, which are drive units, are in any one of a retracted, restrained, and uncontrolled state.

As illustrated in FIG. 6, when the passenger B with the protruding abdomen engages the tongue plate 52 and the buckle 53, the right hip belt 51R and the left hip belt 51L which are now connected by the engagement of the tongue plate 52 and the buckle 53 move to the upper area of the abdomen of the passenger B. The body of the passenger B is not restrained in this state.

The communication unit 43 receives information on the tension applied to each belt and the extended length of each belt from the right sensor 26R in the right motor 25R of the right hip belt 51R, the left sensor 26L in the left motor 25L of the left hip belt 51L, the upper-right sensor 36R in the upper-right motor 35R of the right shoulder belt 61R, and the upper-left sensor 36L in the upper-left motor 35L of the left shoulder belt 61L (step ST11).

The calculating unit 42 of the control unit 40 performs calculations based on the information on the extended length and the tension (step ST12). Next, the control unit 40 controls the length and tension of the belts by sending a signal via the communication unit 43 to any of at least one of the right motor 25R which controls the extended length and tension of the right hip belt 51R by drive force, the left motor 25L which controls the extended length and tension of the left hip belt 51L by drive force, the upper-right motor 35R which controls the extended length and tension of the right shoulder belt 61R by drive force, and the upper-left motor 35L which controls the extended length and tension of the left shoulder belt 61L by drive force (step ST13). As a result, the state is enabled in which the right hip belt 51R, the left hip belt 51L, the right shoulder belt 61R, and the left shoulder belt 61L may be lengthened.

Next, the control unit 40 sends a control signal to the hip belt transfer unit 80 to move the right retractor 21R and the left retractor 21L, which functions as a drive unit, along the right hip belt transfer rail 81R and the left hip belt transfer rail provisioned in a forward and backward direction in relation to the vehicle. As a result, the right hip belt 51R and the left hip belt 51L are moved along the right hip belt transfer rail 81R and the left hip belt transfer rail by moving the right retractor 21R and the left retractor 21L (step ST30). As illustrated in FIG. 15, the engaged portions of the right hip belt 51R and the left hip belt 51L are positioned in front of the abdomen of the passenger B. In this way, the right hip belt 51R and the left hip belt 51L fall downward due to the weight of the buckle 53 by the right hip belt 51R and the left hip belt 51L being positioned in front of the abdomen of the passenger B.

Next, the calculating unit 42 calculates the angle of the right wire 55R and the angle of the left wire 55L in response to the signal from the right bending moment sensor 55RS and the left bending moment sensor 55LS (step ST31). The control unit 40 determines whether or not the angle of the right wire 55R and the angle of the left wire 55L are within a predetermined range (step ST32). If the angle of the right wire 55R and the left wire 55L are outside the predetermined range, the processing returns to the step ST14 and the angle of the right wire 55R and the angle of the left wire 55L are measured again. If the angle of the right wire 55R and the angle of the left wire 55L are within the predetermined range, this represents that the right hip belt 51R and the left hip belt 51L are in suitable positions to restrain the hip of the passenger B, and a retraction control signal is output to retract the right hip belt 51R and the left hip belt 51L (step ST33).

The control unit 40 outputs a control signal to control any of at least the right motor 25R, the left motor 25L, the upper-right motor 35R, and the upper-left motor 35L so as to retract the right hip belt 51R, the left hip belt 51L, the right shoulder belt 61R, and the left shoulder belt 61L, and as illustrated in FIG. 16, the right hip belt 51R and the left hip belt 51L are below the abdomen of the passenger B so that the belts may provide restraint by pressing against the hip bone.

As previously described, in response to the signal from the engagement detection unit 54, the control unit 40 controls any of at least one of the right retractor 21R, the left retractor 21L, the upper-right retractor 31R, and the upper-left retractor 31L, which are all drive units, to loosen the tension in the retraction direction of any of at least the right hip belt 51R, the left hip belt 51L, the right shoulder belt 61R, and the left shoulder belt 61L. When the angle of the right hip belt 51R and the left hip belt 51L are within the predetermined range, the right retractor 21R and the left retractor 21L, which are driving units, are controlled to retract the right hip belt 51R and the left hip belt 51L and reduce the slack.

The control unit 40 controls any of at least one of the right retractor 21R, the left retractor 21L, the upper-right retractor 31R, and the upper-left retractor 31L, which are all drive units, in response to a signal from the engagement detection unit 54, to lengthen the length of any of least one of the right hip belt 51R, the left hip belt 51L, the right shoulder belt 61R, and the left shoulder belt 61L and temporarily loosen the right hip belt 51R and the left hip belt 51L. When the angle of the right hip belt 51R and the left hip belt 51L are within the predetermined range, the right retractor 21R and the upper-left retractor 21L are controlled to retract the right hip belt 51R and the left hip belt 51L to reduce the slack.

Fourth Implementation

Figure 17:
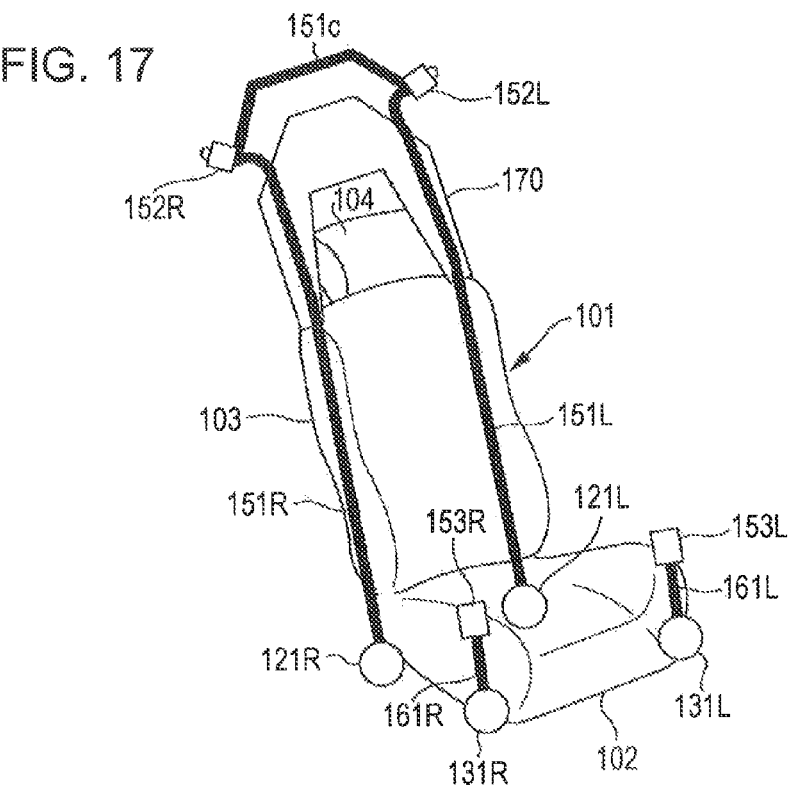
FIG. 17 is an overall perspective diagram of the four-point seat belt device according to a fourth implementation of the present technology.
Figure 18:
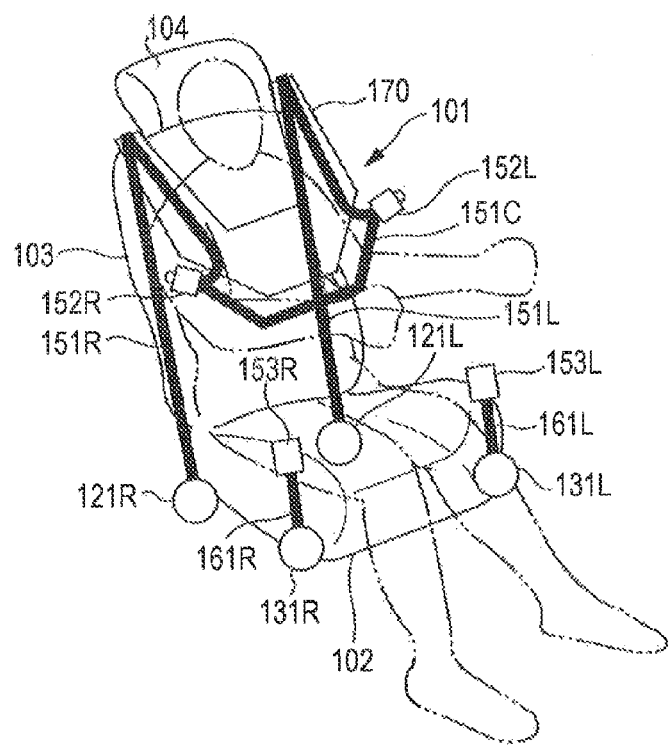
FIG. 18 is an overall perspective diagram of the four-point seat belt device according to the fourth implementation of the present technology.

FIGS. 17 and 18 illustrate a fourth implementation of the present technology. The four-point seat belt device according to the fourth implementation of the present technology will be described with reference to FIGS. 17 and 18.

FIGS. 17 and 18 are overall perspective diagrams of the four-point seat belt device according to the fourth implementation of the present technology.

The seat in a four-point seat belt device 101 according to the present implementation is configured with a seat cushion 102 that passengers sit on and is made from a square cushion placed horizontally in relation to the vehicle, a seat back 103 arranged in a rectangular form nearly vertical to the seat cushion 102 positioned toward the back of the passenger, in which this angle in relation to the seat cushion 102 may be adjusted by the passenger, and a head cushion 104 made from a rectangular cushion and positioned on top of the seat back 103 to correspond to the head position of the passenger.

Via a right retractor 121R, a right shoulder belt 151R that rotates freely is installed to the right side of the seat cushion 102, which functions as the seat of the four-point seat belt device 101. Via a left retractor 121L, a left shoulder belt 151L that rotates freely is installed to the left side of the seat cushion 102, which functions as the seat of the four-point seat belt device 101. The right retractor 121R may be provisioned more to the center of the seat cushion 102 than the right side of the seat cushion 102. The left retractor 121L may be provisioned more to the center of the seat cushion 102 than the left side of the seat cushion 102. The right shoulder belt 151R is provisioned to be extendable by being pulled out from the right retractor 121R, and is provisioned to press against the hip bone of the passenger sitting in the seat. The left shoulder belt 151L is provisioned to be extendable by being pulled out from the left retractor 121L, and is provisioned to press against the hip bone of the passenger sitting in the seat.

A tongue plate 152R is provisioned to the end of the right shoulder belt 151R which is pulled out. A tongue plate 152L is provisioned to the end of the left shoulder belt 151L which is pulled out. A hip belt 151C is provisioned between the tongue plate 152R and the tongue plate 152L. The tongue plate 152R and the tongue plate 152L engage with a right buckle 153R and a left buckle 153L provisioned on the ends of a right belt 161R and a left belt 161L which are pulled out, and the right belt 161R and the left belt 161L are connected to a right retractor 131R and a left retractor 131L.

A vest 170 having a form similar to an apron is provisioned to the right shoulder belt 151R and the left should belt 151L. The vest 170 is provisioned to the long portions of the right shoulder belt 151R and the left shoulder belt 151L. The vest 170 is preferably configured with a soft material. As illustrated in FIG. 17, the right shoulder belt 151R and the left shoulder belt 151L are configured so that the vest 170 made from soft material is independent. A spring mechanism is also provisioned so as to not compress the chest.

The end of the shoulder of the vest 170 is configured to correspond to the shoulder width of the passenger. The hip belt 151C is configured to correspond to the hip width of the passenger.

FIG. 17 illustrates a state in which the vest 170 is independent, and FIG. 18 illustrates a state in which a passenger is sitting in the seat of the four-point seat belt device 101. As illustrated in FIG. 18, the independent vest 170 falls forward to make contact with the chest of the passenger when seated.

Fifth Implementation

Figure 19:
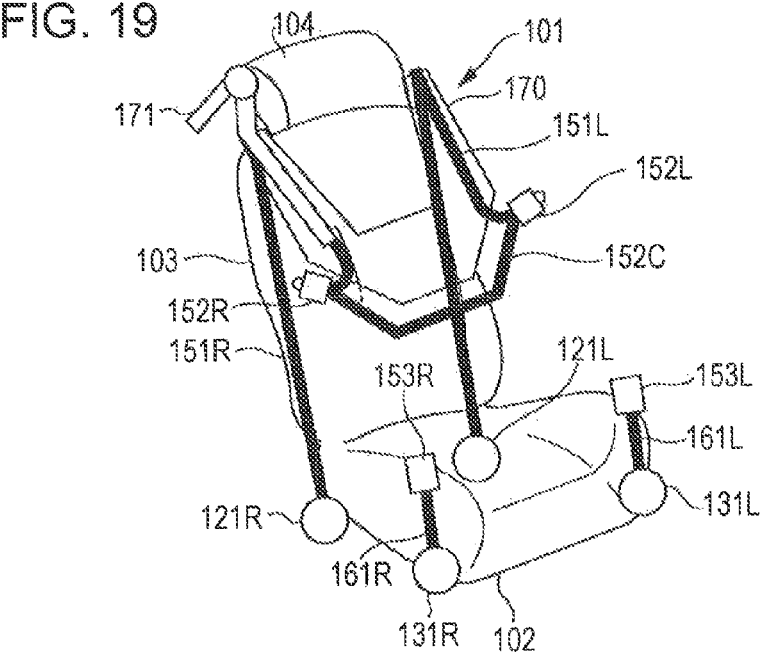
FIG. 19 is an overall perspective diagram of the four-point seat belt device according to a fifth implementation of the present technology.
Figure 20:
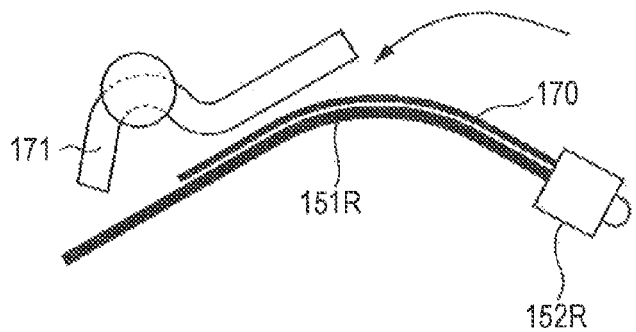
FIG. 20 is an enlarged view of a main component of the four-point seat belt device according to the fifth implementation of the present technology.
Figure 21:
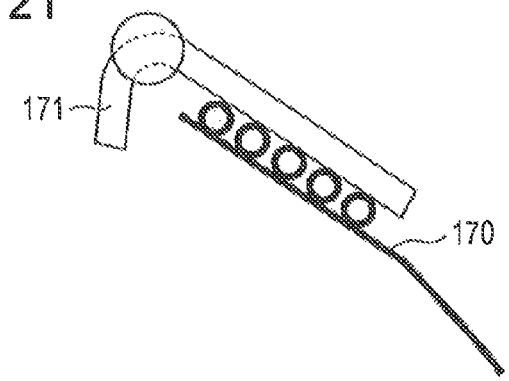
FIG. 21 is an enlarged view of a main component of the four-point seat belt device according to the fifth implementation of the present technology.

FIGS. 19 through 21 illustrate a fifth implementation of the present technology. The four-point seat belt device according to the fifth implementation of the present technology will be described with reference to FIGS. 19 through 21. The configuration in FIG. 19 uses the same reference numerals as those used in FIGS. 17 and 18, and so their descriptions are omitted.

FIG. 19 is an overall perspective diagram of the four-point seat belt device according to the fifth implementation of the present technology. FIGS. 20 and 21 are enlarged views of a main component of the four-point seat belt device according to the fifth implementation of the present technology.

The four-point seat belt device 1 is provisioned with a hinge 171 to enable the independent state of the vest 170. The vest 170 is supported in the independent state by the hinge 171.

As illustrated in FIG. 20, before sitting in the vehicle, the engagement between a tongue of the hinge 171 and an inner belt of the right shoulder belt 151R is verified, the hook is unfastened, and the hinge 171 is stored. The separation of the tongue of the hinge 171 and the inner belt of the right shoulder belt 151R is verified, and the hinge is pushed out to catch the hook.

As illustrated in FIG. 21, when the passenger has fastened the seat belt, the vest 170 engages with the hinge mechanism using the tension from the right shoulder belt 151R being retracted by the right retractor 121R. Such a configuration enables the vest 170 to be independent while not causing interference before the passenger fastens the seat belt, and also may provide support so that the vest 170 covers the chest of the passenger suitably when the passenger fastens the seat belt.

Sixth Implementation

Figure 22:
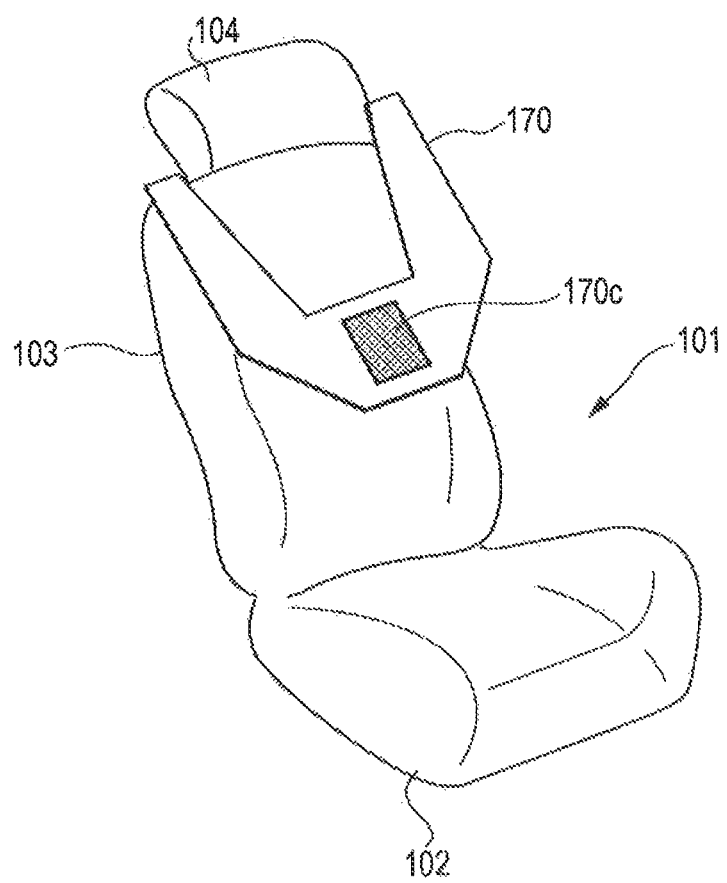
FIG. 22 is an overall perspective diagram of the four-point seat belt device according to a sixth implementation of the present technology.

FIG. 22 illustrates a sixth implementation of the present technology. The four-point seat belt device according to the sixth implementation of the present technology will be described with reference to FIG. 22. The configuration in FIG. 22 uses the same reference numerals as those used in FIGS. 17 and 18, and so their descriptions are omitted.

FIG. 22 is an overall perspective view of the four-point seat belt device according to the sixth implementation of the present technology. The vest 170 is configured with a component 170C, which is a twistable member that corresponds with the chest of the passenger. Such a configuration may not cause interference with movement of the passenger during driving. The component 170C may also be configured with a material having elastic properties. Such a configuration may reduce displacements regarding the chest. The main restraint of the passenger is provided by the right shoulder belt 151R and the left shoulder belt 151L pressing against the clavicle and the hip bone. The vest 170 has an advantage of softly restraining against twisting of the passenger without the application of acceleration force of displacement.

Seventh Implementation

Figure 23:
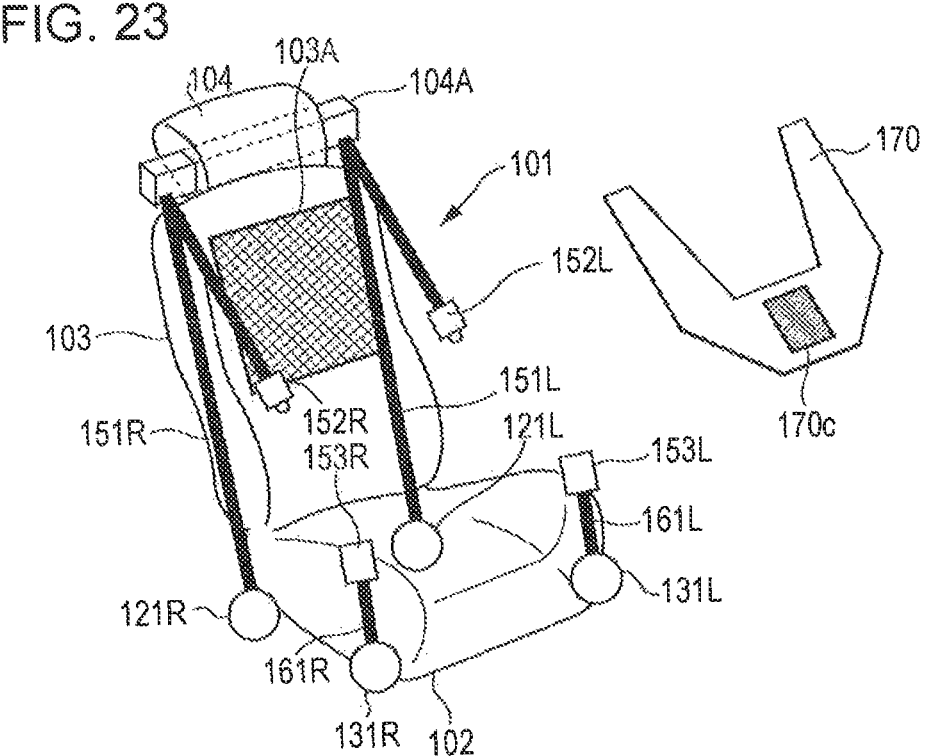
FIG. 23 is an overall perspective diagram of the four-point seat belt device according to a seventh implementation of the present technology.

FIG. 23 illustrates a seventh implementation of the present technology. The four-point seat belt device according to the seventh implementation of the present technology will be described with reference to FIG. 23. The configuration in FIG. 23 uses the same reference numerals as those used in FIGS. 17 and 18, and so their descriptions are omitted.

FIG. 23 is an overall perspective diagram of the four-point seat belt device according to the seventh implementation of the present technology.

A pressure distribution detection unit 103A for detecting the position of the shoulder bone of the passenger is provisioned in the seat back 103. A shoulder width actuator 104A for adjusting the position of the right shoulder belt 151R and the left shoulder belt 151L to correspond to the shoulder position of the passenger is provisioned in the head cushion 104. When the passenger sits in the seat of the four-point seat belt device 101, the pressure distribution detection unit 103A detects the position of the shoulder bone of the passenger. Next, the shoulder width actuator 104A adjusts the position of the right shoulder belt 151R and the left shoulder belt 151L to correspond to the position of the shoulder of the passenger. As a result, the right shoulder belt 151R and the left shoulder belt 151L may be automatically adjusted depending on the should width of the passenger. As illustrated in FIG. 23, the vest 170 may be removed, and may be used to restrain the chest of the passenger. The component 170C is configured with a twistable member and corresponds with the chest of the passenger.

Eighth Implementation

Figure 24:
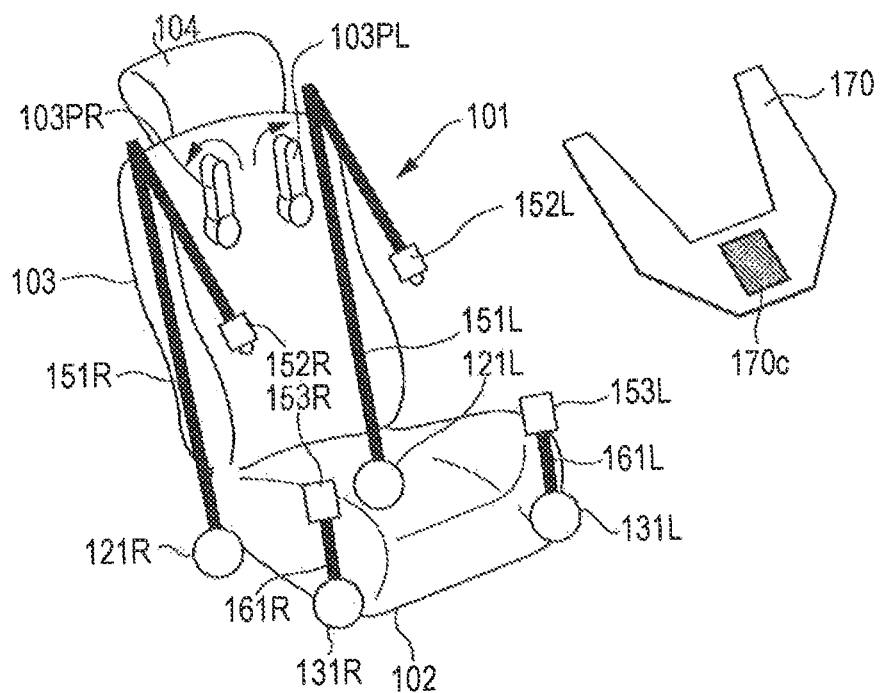
FIG. 24 is an overall perspective diagram of the four-point seat belt device according to an eighth implementation of the present technology.

FIG. 24 illustrates an eighth implementation of the present technology. The four-point seat belt device according to the eighth implementation of the present technology will be described with reference to FIG. 24. The configuration in FIG. 24 uses the same reference numerals as those used in FIGS. 17 and 18, and so their descriptions are omitted.

FIG. 24 is an overall perspective diagram of the four-point seat belt device according to the eighth implementation of the present technology.

A right paddle 103PR and a left paddle 103PL that are movable by the shoulder bone of the passenger are provisioned on the right and left sides of the seat back 103. The right paddle 103PR and the left paddle 103PL connect to the right shoulder belt 151R and the left shoulder belt 151L and widen depending on the width of the shoulder bone of the passenger to enable the adjustment of the width of the right shoulder belt 151R and the left shoulder belt 151L depending on the shoulder width of the passenger. As illustrated in FIG. 24, the vest 170 may be removed, and may be used to restrain the chest of the passenger. The component 170C is configured with a twistable member and corresponds with the chest of the passenger.

Ninth Implementation

Figure 25:
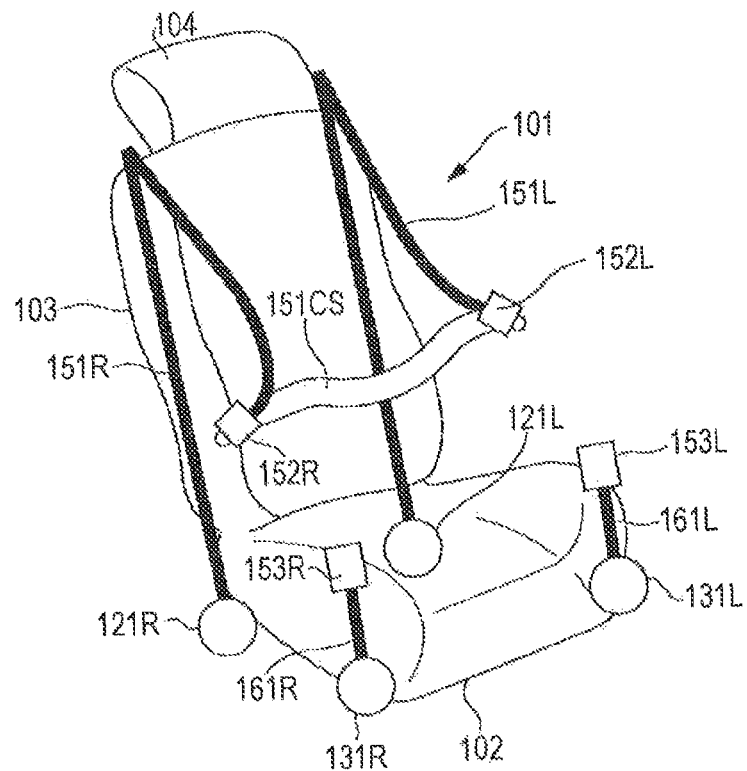
FIG. 25 is an overall perspective diagram of the four-point seat belt device according to a ninth implementation of the present technology.
Figure 26:
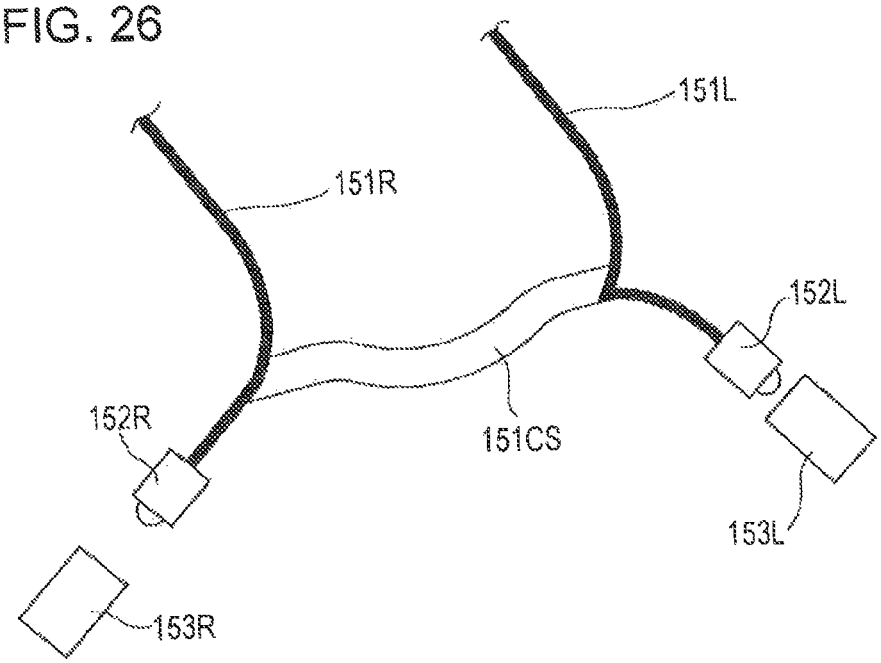
FIG. 26 is an enlarged view of a main component of the four-point seat belt device according to the ninth implementation of the present technology.

FIGS. 25 and 26 illustrate a ninth implementation of the present technology. The four-point seat belt device according to the ninth implementation of the present technology will be described with reference to FIGS. 25 and 26. The configuration in FIG. 25 uses the same reference numerals as those used in FIGS. 17 and 18, and so their descriptions are omitted.

FIG. 25 is an overall perspective diagram of the four-point seat belt device according to the ninth implementation of the present technology. FIG. 26 is an enlarged view of a main component of the four-point seat belt device according to the ninth implementation of the present technology. The right tongue plate 152R is provisioned to the end of the right shoulder belt 151R which is pulled out, and the tongue plate 152L is provisioned to the end of the left shoulder belt 151L which is pulled out, and a hip belt 151CS is provisioned between the tongue plate 152R and the tongue plate 152L. The tongue plate 152R and the tongue plate 152L engage with the right buckle 153R and the left buckle 153L provisioned on the ends of the right belt 161R and the left belt 161L which are pulled out, and the right belt 161R and the left belt 161L are connected to the right retractor 131R and the left retractor 131L.

As illustrated in FIG. 26, the hip belt 151CS is made from a material having elastic properties. When a vehicle collision is detected, the right retractor 131R and the left retractor 131L retract the right belt 161R and the left belt 161L, the right retractor 121R and the left retractor 121L retracts the right shoulder belt 151R and the left shoulder belt 151L, and simultaneously the elasticity of the hip belt 151CS catches the passenger.

Configuration and Advantages of the Implementations

The four-point seat belt device according to the preset implementations are configured with two hip belts pressing against the hip bone of a passenger sitting in a seat and two shoulder belts pressing against both shoulders of the passenger, a drive unit to retract the belts, an engagement detection unit to detect the state in which the hip belts and the shoulder belts are engaged via a buckle, and the engagement detection unit to detect that the hip belt is not making contact with the passenger, in which the engagement detection unit detects an engagement, and the drive unit retracts the hip belts when the engagement detection unit detects that the hip belts are not making contact with the passenger.

The previously described configuration enables the detection of the hip belts not making contact with the passenger, and the restraint of the hip bone of the passenger by the hip belts.

Regarding the four-point seat belt device according to the present implementations, the detection unit is a bending moment detection unit to detect that the hip belts are not making contact by the angle, in which the drive unit retracts the hip belts in response to a signal from a bending moment detection unit representing that the angle of the hip belts are within a predetermined range after the engagement detection unit detects an engagement.

The previously described configuration enables the detection of the hip belts being in a suitable position to restrain the hips of the passenger, and the restraint of the hip bone of the passenger by the hip belts.

Regarding the four-point seat belt device according to the present implementations, the drive unit establishes an uncontrolled state regarding at least any one of the hip belts and the shoulder belts when the engagement detection unit detects an engagement, and afterwards retracts the hip belts in response to a signal from a bending moment detection unit representing that the angle of the hip belts are within a predetermined range.

The previously described configuration enables the restraint of the hip bone of the passenger by the hip belts.

Regarding the four-point seat belt device according to the present implementations, the drive unit includes a pulley and motor to retract the belt.

The previously described configuration enables the retraction of the belts and the restraint of the hip bone of the passenger by the hip belts.

Regarding the four-point seat belt device according to the present implementations, the drive unit loosens the drive force applied to at least one belt motor regarding the hip belts and the shoulder belts, and afterwards retracts the hip belts in response to a signal from a bending moment detection unit representing that the angle of the hip belts are within a predetermined range.

The previously described configuration enables the detection of the hip belts being in a suitable position to restrain the hips of the passenger, the retraction of the belts, and the restraint of the hip bone of the passenger by the hip belts.

Regarding the four-point seat belt device according to the present implementations, the drive unit operates at any one state including the retract, retain, and uncontrolled state before the engagement detection unit detects an engagement, and the drive unit retracts at least any one of the hip belts and the shoulder belts in response to a signal from a bending moment detection unit representing that the angle of the hip belt is within a predetermined range.

The previously described configuration enables the detection of the hip belts being in a suitable position to restrain the hips of the passenger, and the restraint of the hip bone of the passenger by the hip belts.

The invention claimed is:

1. A four-point seat belt device comprising:
   two hip belts to press against the hip bone of a passenger sitting in a seat;
   two shoulder belts to press against both shoulders of the passenger;
   a drive unit arrangement to retract the belts;
   an engagement detection unit to detect the state in which the hip belts and the shoulder belts are engaged via a buckle; and
   a detection unit to detect that the hip belts are not making contact with the passenger;
   wherein the drive unit arrangement is operable to retract the hip belts when the engagement detection unit detects an engagement and the detection unit detects that the hip belts are not making contact with the passenger.

2. The four-point seat belt device according to claim 1, wherein
   the detection unit is a bending moment detection unit to detect that the hip belts are not making contact with the passenger by an angle of the hip belts, and
   the drive unit arrangement is operable to retract the hip belts in response to a signal from the bending moment detection unit representing that the angle of the hip belts is within a predetermined range after the engagement detection unit detects an engagement.

3. The four-point seat belt device according to claim 1, wherein the drive unit arrangement is operable to establish an uncontrolled state of at least one of the belts when the engagement detection unit detects an engagement, and to afterwards retract the hip belts in response to a signal from the detection unit representing that an angle of the hip belts is within a predetermined range.

4. The four-point seat belt device according to claim 1, wherein the drive unit arrangement includes a pulley and motor to retract a belt.

5. The four-point seat belt device according to claim 4, wherein the drive unit arrangement is operable, in the event that the engagement detection unit has detected an engagement, to loosen the drive force applied from at least one motor to at least one of the belts, and to afterwards retract the hip belts in response to a signal from the detection unit representing that an angle of the hip belts is within a predetermined range.

6. The four-point seat belt device according to claim 1, wherein the drive unit arrangement is operable in any one of a retract, a retain, and an uncontrolled state before the engagement detection unit detects an engagement, and the drive unit arrangement is operable to retract at least one of the belts in response to a signal from the detection unit representing that an angle of the hip belts is within a predetermined range after the engagement detection unit has detected an engagement.

7. The four-point seat belt device according to claim 1, wherein the seat belt device is operable, when the engagement detection unit detects an engagement, to: separate the hip belts from making contact with the passenger; move the hip belts downward; and retract the hip belts to restrain the passenger.

8. The four-point seat belt device according to claim 1, wherein the seat belt device is operable, when the engagement detection means detects an engagement, to: separate the hip belts from making contact with the passenger; move the hip belts downward; and retract the hip belts to restrain the passenger.

9. A four-point seat belt device comprising:
   two hip belts to press against the hip bone of a passenger sitting in a seat;
   two shoulder belts to press against both shoulders of the passenger;
   drive means for retracting the belts;
   engagement detection means for detecting the state in which the hip belts and the shoulder belts are engaged via a buckle; and
   detection means for detecting that the hip belts are not making contact with the passenger;
   wherein the drive means is operable to retract the hip belts when the engagement detection means detects an engagement and the detection means detects that the hip belts are not making contact with the passenger.

10. The four-point seat belt device according to claim 8, wherein
    the detection means is a bending moment detection unit to detect that the hip belts are not making contact with the passenger by an angle of the hip belts, and
    the drive means is operable to retract the hip belts in response to a signal from the bending moment detection unit representing that the angle of the hip belts is within a predetermined range after the engagement detection means detects an engagement.

11. The four-point seat belt device according to claim 8, wherein the drive means is operable to establish an uncontrolled state of at least one of the belts when the engagement detection means detects an engagement, and to afterwards retract the hip belts in response to a signal from the detection means representing that an angle of the hip belts is within a predetermined range.

12. The four-point seat belt device according to claim 8, wherein the drive means includes a pulley and motor to retract a belt.

13. The four-point seat belt device according to claim 12, wherein the drive means is operable, in the event that the engagement detection means has detected an engagement, to loosen the drive force applied from at least one motor to at least one of the belts, and to afterwards retract the hip belts in response to a signal from the detection means representing that an angle of the hip belts is within a predetermined range.

14. The four-point seat belt device according to claim 8, wherein the seat belt device is operable, when the engagement detection means detects an engagement, to: separate the hip belts from making contact with the passenger; move the hip belts downward; and retract the hip belts to restrain the passenger.

\* \* \* \* \*